(12) United States Patent
Tateishi et al.

(10) Patent No.: US 8,253,426 B2
(45) Date of Patent: Aug. 28, 2012

(54) CAPACITANCE DETECTOR

(75) Inventors: Kiyoshi Tateishi, Hannou (JP); Yuji Tawaragi, Tokyo (JP)

(73) Assignee: Pioneer Corporation, Tokyo (JP)

( * ) Notice: Subject to any disclaimer, the term of this patent is extended or adjusted under 35 U.S.C. 154(b) by 290 days.

(21) Appl. No.: 12/738,240

(22) PCT Filed: Oct. 18, 2007

(86) PCT No.: PCT/JP2007/070372
§ 371 (c)(1),
(2), (4) Date: Jun. 1, 2010

(87) PCT Pub. No.: WO2009/050813
PCT Pub. Date: Apr. 23, 2009

(65) Prior Publication Data
US 2010/0231239 A1    Sep. 16, 2010

(51) Int. Cl.
*G01R 27/26* (2006.01)
(52) U.S. Cl. ........................................ 324/658
(58) Field of Classification Search ........................ None
See application file for complete search history.

(56) References Cited

U.S. PATENT DOCUMENTS

| 5,321,366 | A  | * | 6/1994 | Noboru et al. | 324/663 |
| 5,726,579 | A  | * | 3/1998 | Masuda | 324/679 |
| 7,250,773 | B2 | * | 7/2007 | Takekawa et al. | 324/662 |
| 2004/0160234 | A1 | * | 8/2004 | Denen et al. | 324/679 |
| 2007/0007971 | A1 | * | 1/2007 | Takekawa et al. | 324/662 |
| 2011/0234206 | A1 | * | 9/2011 | Kawakubo et al. | 324/162 |

FOREIGN PATENT DOCUMENTS

| JP | 56-008563 | 1/1981 |
| JP | 08-278336 | 10/1996 |
| JP | 08-307199 | 11/1996 |
| JP | 09-049736 | 2/1997 |
| JP | 2000-193737 | 7/2000 |
| JP | 3126872 | 11/2000 |
| JP | 2004-127489 | 4/2004 |
| JP | 2007-46927 | 2/2007 |

* cited by examiner

*Primary Examiner* — Jermele M Hollington
(74) *Attorney, Agent, or Firm* — Drinker Biddle & Reath LLP

(57) ABSTRACT

A capaciatance detector is provided, which outputs an electric signal dependent on the capacitance present on an object to be measured. The capaciatance detector includes a measurement terminal to be disposed in contact with or in proximity to the object being measured; an impedance conversion circuit connected to the measurement terminal to form a resonant circuit; a reference phase oscillator for supplying a reference phase signal at a constant frequency to the resonant circuit; phase comparison means for outputting, as a capacitance detected signal, a phase difference signal indicative of the phase difference between a resonant signal, which is extracted from the resonant circuit in response to the reference phase signal being applied to the resonant circuit, and the reference phase signal; and resonance frequency regulation means for regulating the resonance frequency of the resonant circuit based on the phase difference signal.

14 Claims, 14 Drawing Sheets

FIG. 4
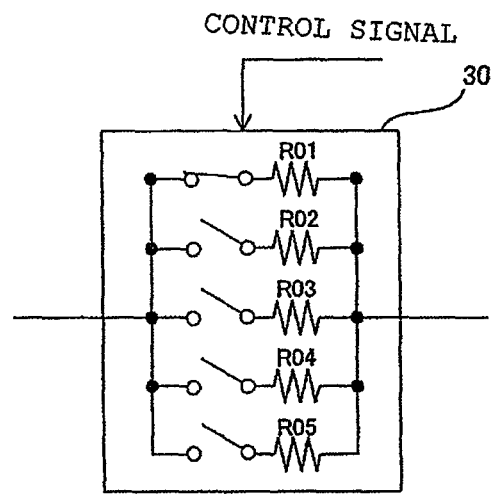
(a)
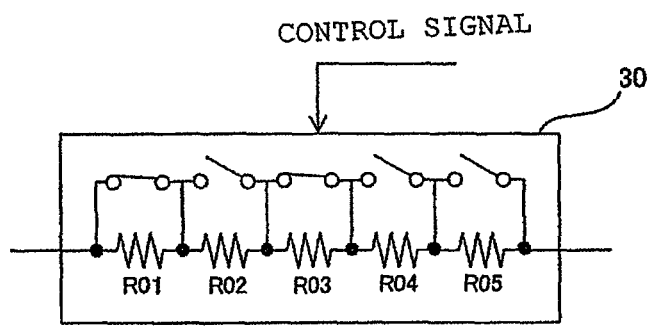
(b)
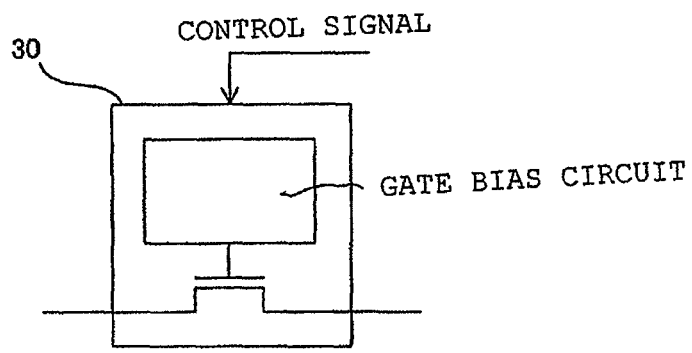
(c)

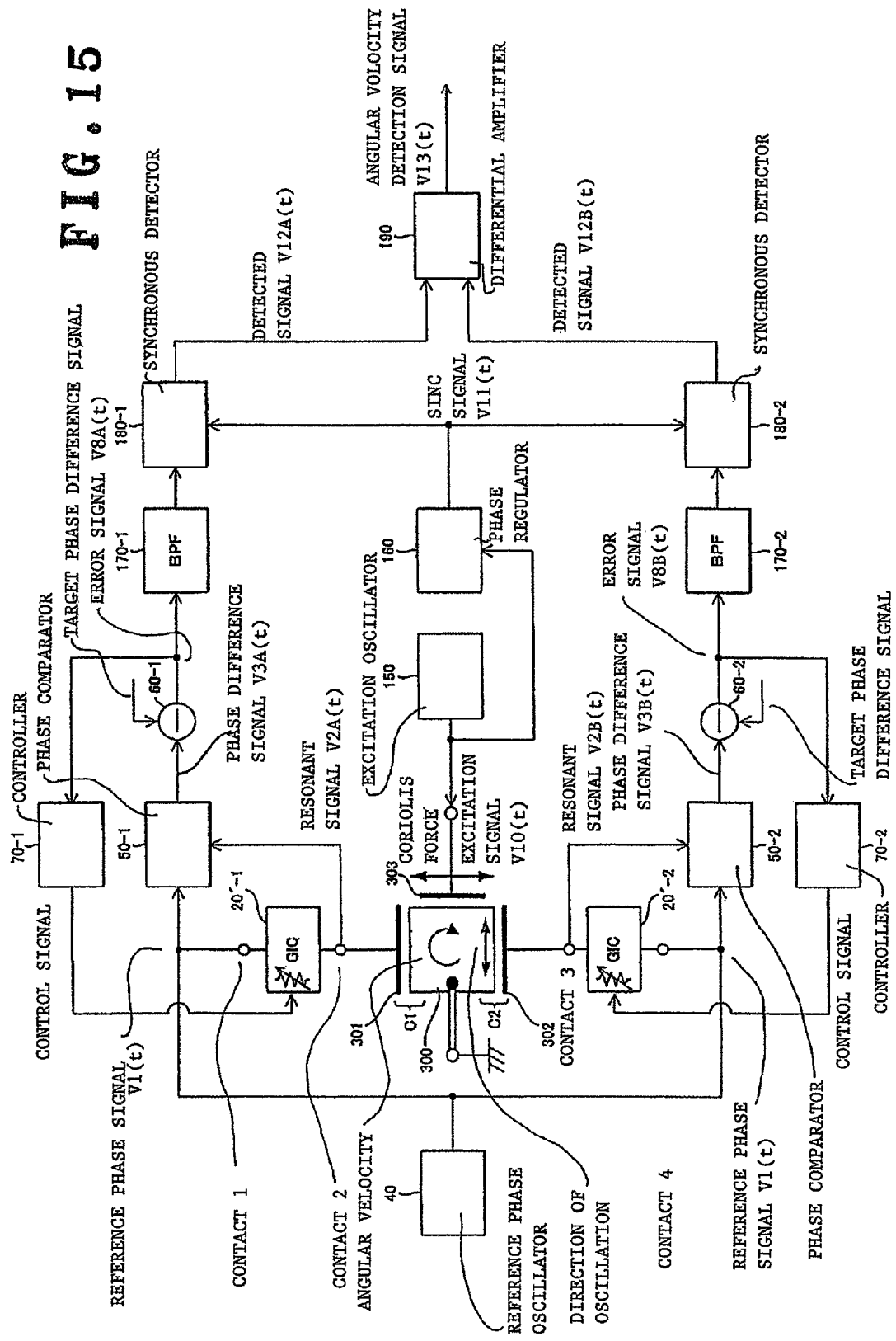

CAPACITANCE DETECTOR

This application is the National Stage of International Application No. PCT/JP2007/070372, filed Oct. 18, 2007.

TECHNICAL FIELD

The present invention relates to a capaciatance detector which converts the capacitance of a capacitor component attendant on an object to be measured into an electric signal for output.

BACKGROUND ART

In various technical fields, use has been made of capaciatance detectors which convert the capacitance of a capacitor component attendant on an object to be measured into an electric signal for output, where the capacitance varies according to the physical quantity and physical properties of the measured object. Based on the detected signal delivered from such a capaciatance detector, the physical quantity and physical properties of the measured object are determined.

For example, in Patent Document 1, there is disclosed a fuel mixing ratio detector for detecting the mixing ratio of fuel. The detector includes a resonant circuit which is made up of a winding coil L and a capacitor Cf with its capacitance varying depending on the quantity of fuel. The resonant circuit is supplied with a high-frequency signal from a voltage controlled oscillator via an amplifier and a resistor R. Then, the phase difference between signals appearing at both ends P1 and P2 across the resistor R is detected at a phase comparator for output as a phase difference voltage, by which the fuel mixing ratio is determined.

In Patent Document 2 (FIG. 12), there is disclosed an acceleration sensor for detecting the acceleration of a plumb weight. The acceleration is determined by applying square wave signals Φ1 and Φ2, having phases different from each other, to variable capacitors C1 and C2 via resistors R1 and R2, where the capacitors C1 and C2 vary in capacitance as the plumb weight is displaced. Resulting square wave signals appearing on the upper electrode of auxiliary capacitors CC1 and CC2 are supplied to an EX-OR circuit to detect the difference between the capacitance of the variable capacitor C1 and the capacitance of the variable capacitor C2. The acceleration of the plumb weight is determined in this manner.

In Patent Document 3, there is disclosed a polarization orientation detector for ferroelectric materials which makes use of SNDM (Scanning Nonlinear Dielectric Microscope). That is, this device is designed to locate the probe on the surface of a target ferroelectric material to measure its capacitance Cp immediately underneath the probe, thereby determining the polarization orientation of the ferroelectric material. Such a device allows the polarization orientation of the ferroelectric material to be detected by applying alternating electric field Ep from outside between the electrode, and the ring probe and the probe. The alternating electric field causes the oscillation frequency of the oscillator to vary. The rate of change in oscillation frequency including its sign at this time is determined by the capacitance Cp of the ferroelectric material immediately underneath the probe. Thus, the rate of change in frequency can be two-dimensionally scanned with the probe, thereby detecting the polarization distribution of the ferroelectric material. The change in frequency of the oscillator is determined by being synchronously detected at the frequency of the applied electric field by the PSK demodulator after having been demodulated at an FM demodulator.

Patent Document 1: Japanese Patent No. 3126872
Patent Document 2: Japanese Patent Kokai No. 2007-46927
Patent Document 3: Japanese Patent Kokai No. 2004-127489

DISCLOSURE OF THE INVENTION

Problems to be Solved by the Invention

According to the device disclosed in Patent Document 1 above, the LC resonant circuit for detecting phase differences is made up of the winding coil L and the capacitor Cf of the measured object. The capacitance detection portion including the LC resonant circuit may be integrated into an LSI to reduce the size of the device. However, in this case, the winding coil can be included in the LSI but with difficulty. Currently, the MEMS (Micro Electro Mechanical Systems) technique makes it possible to manufacture a micro inductor which is provided with a three-dimensional structure through semiconductor processes. However, forming a very small coil on a semiconductor substrate causes an increase in parasitic capacitance, thereby making it difficult to provide a resonant circuit with a high Q value. As with the device disclosed in Patent Document 1, in such a device which detects capacitance by applying high-frequency signals to the resonant circuit and then comparing their phases, the Q value of the resonant circuit is a critical factor which determines the capacitance sensitivity. Thus, setting a high Q value to the resonant circuit is inevitable to implement highly sensitive capacitance detection. On the other hand, to detect capacitance by phase comparison, the frequency of the high-frequency signal to be applied to the resonant circuit must coincide generally with the resonance frequency f0 of the resonant circuit. However, when the measured object varies in capacitance, for example, due to a change in ambient temperature, the resonance frequency f0 of the resonant circuit also varies accordingly. This causes the resonance frequency f0 of the resonant circuit and the frequency of the high-frequency signal applied to the resonant circuit to differ substantially from each other. As a result, the high-frequency signal falls in a frequency region where no phase shift occurs corresponding to the change in capacitance to be detected, thereby significantly reducing capacitance sensitivity.

The present invention has been developed in view of the aforementioned points. It is therefore an object of the present invention to provide a capaciatance detector which includes a resonant circuit made up of a capacitor component attendant on an object to be measured. The detector converts the capacitance of the capacitor component attendant on the measured object into an electric signal for output, based on the phase of the resonant signal extracted from the resonant circuit. The sensor also facilitates LSI fabrications, allowing for setting a high Q value to the resonant circuit even in the form of LSI. Furthermore, even when the capacitance of the measured object varies due to a change in ambient temperature, the detector can maintain a high sensitivity.

Means for Solving the Problem

A capaciatance detector of the present invention is a capaciatance detector for outputting an electric signal dependent on the capaciatance present on an object to be measured. The capaciatance detector includes a measurement terminal to be disposed in contact with or in proximity to the object being measured; an impedance conversion circuit connected to the measurement terminal to form a resonant circuit; a reference phase oscillator for supplying a reference phase signal at a constant frequency to the resonant circuit; phase comparison means for outputting, as a capacitance detected signal, a phase difference signal indicative of the phase difference between a resonant signal, which is extracted from the resonant circuit in response to the reference phase signal being applied to the resonant circuit, and the reference phase signal; and resonance frequency regulation means for regulating the resonance frequency of the resonant circuit based on the phase difference signal.

The present invention also provides a polarization orientation detector for a ferroelectric material. The polarization orientation detector includes at least one probe to be disposed in contact with or in proximity to the surface of a ferroelectric material, and electric field application means for applying an alternating electric field to a capacitor component within the ferroelectric material immediately underneath the probe. The detector detects the polarization orientation of the ferroelectric material immediately underneath the probe based on a change in capacitance of the capacitor component caused by an application of the alternating electric field to the ferroelectric material. The polarization orientation detector includes a resonant circuit including the capacitor component and an impedance conversion circuit; a reference phase oscillator for applying a reference phase signal at a constant frequency to the resonant circuit; phase comparison means for creating a phase difference signal indicative of a phase difference between a resonant signal, which is extracted from the resonant circuit in response to the reference phase signal being applied to the resonant circuit, and the reference phase signal; synchronous detection means for synchronously detecting the phase difference signal based on a sync signal and for creating a regenerated signal corresponding to a polarization orientation of the ferroelectric material; and resonance frequency regulation means for regulating the resonance frequency of the resonant circuit based on the phase difference signal.

The present invention also provides an acceleration sensor. The acceleration sensor includes a plumb weight displaced due to acceleration acting thereon, and first and second electrodes disposed apart from the plumb weight and disposed opposite to each other across the plumb weight in a direction of displacement of the plumb weight. The acceleration sensor detects the acceleration acting on the plumb weight based on the capacitances of a first capacitor and a second capacitor. Here, the first capacitor has a capacitance determined by a gap length between the plumb weight and the first electrode, and the second capacitor has a capacitance determined by a gap length between the plumb weight and the second electrode. The acceleration sensor is characterized by including a first resonant circuit including the first capacitor and an impedance conversion circuit; a second resonant circuit including the second capacitor and an impedance conversion circuit; a single reference phase oscillator for applying a reference phase signal at a constant frequency to the first and second resonant circuits; phase comparison means for creating a first phase difference signal and a second phase difference signal, the first phase difference signal being indicative of the phase difference between a first resonant signal, which is extracted from the first resonant circuit in response to the reference phase signal being applied to the first resonant circuit, and the reference phase signal, the second phase difference signal being indicative of the phase difference between a second resonant signal, which is extracted from the second resonant circuit in response to the reference phase signal being applied to the second resonant circuit, and the reference phase signal; a signal operational unit for outputting, as an acceleration detection signal, a signal dependent on the difference between the first phase difference signal and the second phase difference signal; and resonance frequency regulation means for regulating the resonance frequency of the first resonant circuit based on the first phase difference signal and for regulating the resonance frequency of the second resonant circuit based on the second phase difference signal.

The present invention also provides an angular velocity detector which has an oscillator, an excitation signal generator, and first and second electrodes. Here, the oscillator oscillates in response to a supplied excitation signal and is displaced by Coriolis force acting thereon due to rotational angular velocity around a given axis during oscillation. The excitation signal generator supplies the excitation signal to the oscillator. The first and second electrodes are disposed apart from the oscillator and disposed opposite to each other across the oscillator in a direction of displacement of the oscillator. The angular velocity sensor detects an angular velocity applied to the oscillator based on capacitances of a first capacitor and a second capacitor, wherein the first capacitor has a capacitance determined by a gap length between the oscillator and the first electrode, and the second capacitor has a capacitance determined by a gap length between the oscillator and the second electrode. The angular velocity sensor is characterized by having a first resonant circuit including the first capacitor and an impedance conversion circuit; a second resonant circuit including the second capacitor and an impedance conversion circuit; a single reference phase oscillator for applying a reference phase signal at a constant frequency to the first and second resonant circuits; phase comparison means for creating a first phase difference signal and a second phase difference signal, the first phase difference signal being indicative of the phase difference between a first resonant signal, which is extracted from the first resonant circuit in response to the reference phase signal being applied to the first resonant circuit, and the reference phase signal, the second phase difference signal being indicative of the phase difference between a second resonant signal, which is extracted from the second resonant circuit in response to the reference phase signal being applied to the second resonant circuit, and the reference phase signal; a signal operational unit for outputting, as an angular velocity detection signal, a signal dependent on the difference between the first phase difference signal and the second phase difference signal; and resonance frequency regulation means for regulating the resonance frequency of the first resonant circuit based on the first phase difference signal and for regulating the resonance frequency of the second resonant circuit based on the second phase difference signal.

BRIEF DESCRIPTION OF THE DRAWINGS

FIG. 4 is a view illustrating the configuration of a variable resistor according to an embodiment of the present invention.

FIG. 15 is a block diagram illustrating an angular velocity sensor to which a capaciatance detector of the present invention is applied.

DESCRIPTION OF THE REFERENCE SYMBOLS

Figure 1:
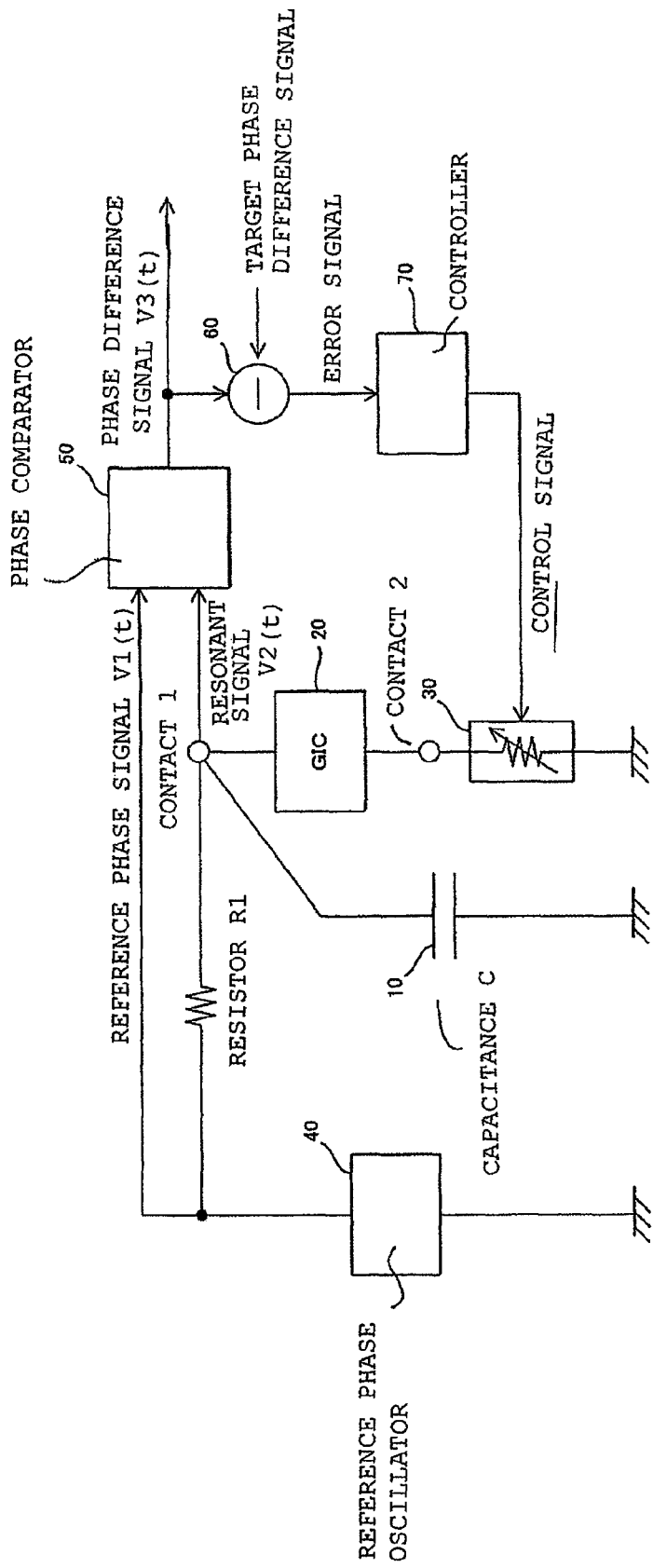
FIG. 1 is a block diagram illustrating a capaciatance detector according to an embodiment of the present invention.

10 Capacitor
20 Impedance conversion circuit
30 Variable resistor
40 Reference phase oscillator
50 Phase comparator
60 Subtracter
70 Controller
80 Electric-field application oscillator
110 Synchronous detector
130 Differential amplifier
150 Excitation oscillator
190 Differential amplifier
200 Plumb weight
201 First electrode
202 Second electrode
300 Oscillator
301 First electrode
302 Second electrode

DETAILED DESCRIPTION OF THE EMBODIMENTS

Now, a description will be made to the present invention in accordance with the embodiments with reference to the drawings. Note that in the drawings to be referred to below, those substantially the same or equivalent components or parts will be denoted with the same reference symbols.

First Embodiment

FIG. 1 is a block diagram illustrating the configuration of a capaciatance detector of the present invention. There is shown a capacitor 10 which serves to be measured with the capaciatance detector of the present invention. The capacitor 10 has one electrode grounded and the other electrode connected to a contact 1 of the capaciatance detector of the present invention in order to detect the capacitance. That is, the contact 1 functions as a measurement terminal for the capaciatance detector of the present invention. Note that the measurement terminal may be disposed in close proximity to the capacitor 10 for measurement of the capacitance. In the discussions below, the capacitance of the capacitor 10 is denoted as C.

Figure 2:
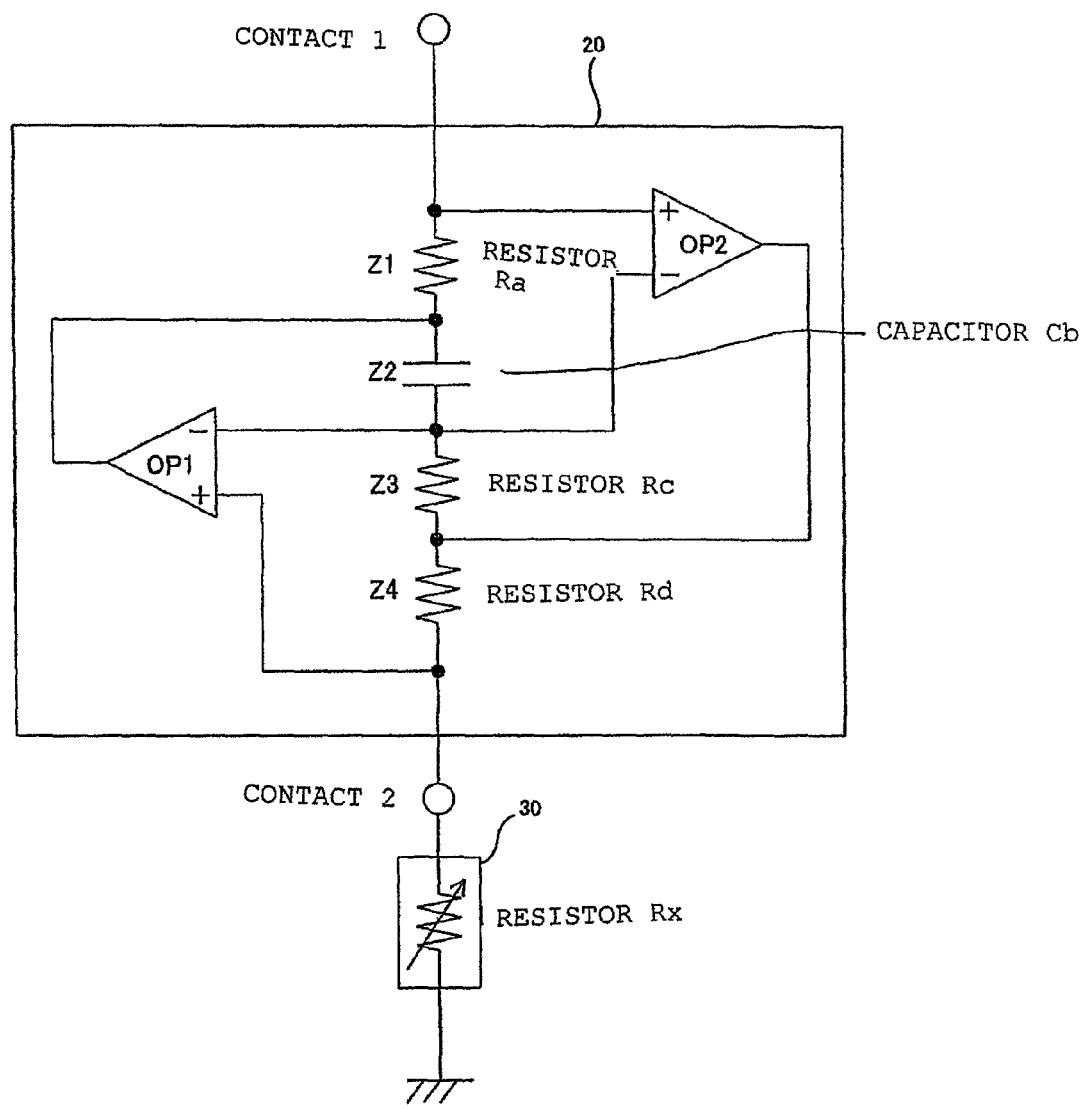
FIG. 2 is an equivalent circuit diagram illustrating an impedance conversion circuit according to an embodiment of the present invention.

There is also shown an impedance conversion circuit (or Generalized Impedance Converter (GIC)) 20 which can produce any impedance by appropriately combining the passive components that constitute the circuit 20 and which is connected to the contact 1 serving as the measurement terminal. Furthermore, the impedance conversion circuit 20 is connected at a contact 2 in series with a variable resistor 30 with its one end grounded. At this time, when viewed from the contact 1, the combined impedance Z×1 of the circuit formed of the impedance conversion circuit 20 and the variable resistor 30 is equivalent to an inductor. That is, the impedance conversion circuit 20 and the variable resistor 30 are connected in series with each other, thereby forming an equivalent inductor. This principle will be explained below with reference to FIG. 2. FIG. 2 shows an example of an equivalent circuit diagram of the impedance conversion circuit 20 to which the variable resistor 30 is connected at the contact 2. The impedance conversion circuit 20 is formed of resistors Ra, Rc, and Rd and a capacitor Cb, which are connected in series with one another between the contact 1 and the contact 2, and operational amplifiers OP1 and OP2 which are connected to these passive components. At this time, when viewed from the contact 1, the combined impedance Z×1 can be expressed by $$Z\times 1 = Z1 \cdot Z3 \cdot Rx/(Z2 \cdot Z4) \quad (1)$$

where Rx is the resistance value of the variable resistor 30. Substituting the impedance values corresponding to Z1 to Z4 into Equation (1) above gives $$Z\times 1 = j\omega(Ra \cdot Rc \cdot Cb \cdot Rx/Rd) = j\omega L \; (\because L = Ra \cdot Rc \cdot Cb \cdot Rx/Rd) \quad (2)$$

As can be seen clearly in Equation (2), the contact 1 can be regarded as being connected with an inductor (coil) having an inductance L (=Ra·Rc·Cb·Ri/Rd).

The equivalent inductor formed of the impedance conversion circuit 20 and the variable resistor 30 is connected in parallel with the capacitor 10, thereby implementing an equivalent LC parallel resonant circuit. This equivalent LC resonant circuit (hereinafter referred to as the resonant circuit) is applied with an alternating high-frequency signal or a reference phase signal V1(t) at a constant frequency from a reference phase oscillator 40 via a resistor R1 disposed between the contact 1 and the reference phase oscillator 40. The reference phase signal V1(t) has a frequency which is set near the resonance frequency f0 of the resonant circuit mentioned above. The reference phase signal V1(t) is also supplied to a phase comparator 50. Application of the reference phase signal V1(t) to the resonant circuit causes a resonant signal V2(t) to appear at the contact 1. The resonant signal V2(t) has the same frequency as the reference phase signal V1(t) and a phase corresponding to the capacitance of the capacitor 10. That is, there is a phase difference between the reference phase signal V1(t) and the resonant signal V2(t), corresponding to the capacitance of the capacitor 10. Now, the reason for this phenomenon will be explained below with reference to FIG. 3.

Figure 3:
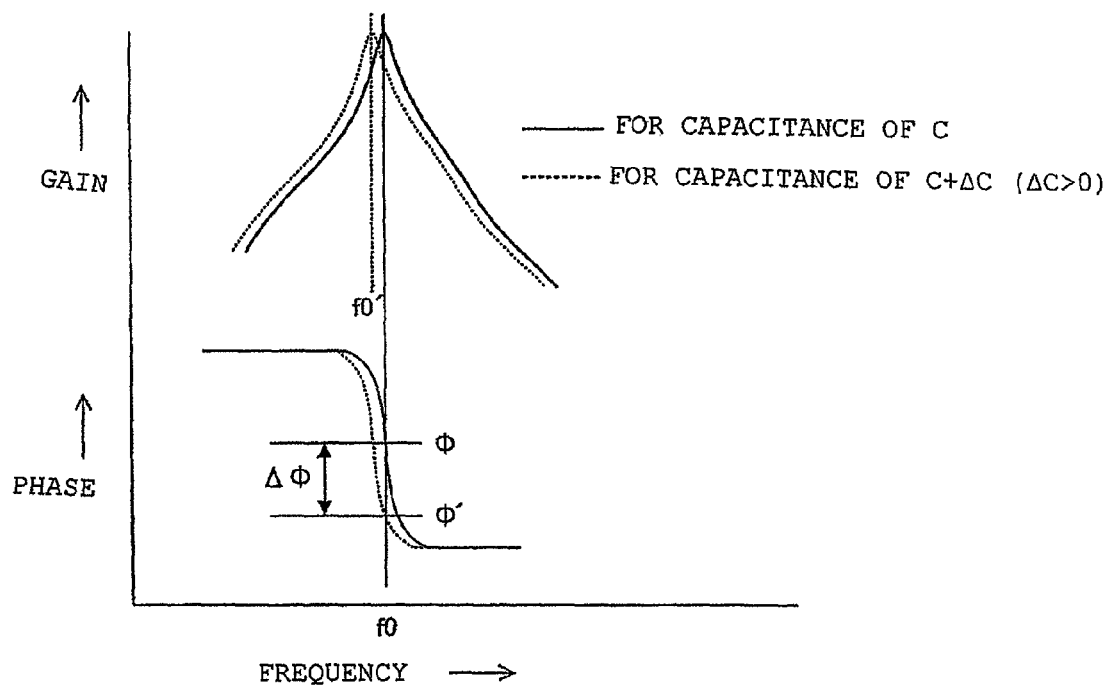
FIG. 3 is a view illustrating frequency transfer characteristics of a resonant circuit according to an embodiment of the present invention.

FIG. 3 shows the frequency transfer characteristics of the aforementioned resonant circuit from the reference phase signal V1(t) to the resonant signal V2(t). In FIG. 3, the transfer characteristics are denoted with solid lines when the capacitance of the capacitor 10 to be measured has a nominal value C, and the transfer characteristics are denoted with broken lines when the capacitance has varied by ΔC from the nominal value C, i.e., for a capacitance of C+ΔC. When the capacitance of the capacitor 10 is C, the resonance frequency f0 of the resonant circuit is given by $$f0 = 1/[2\pi\sqrt{(L \cdot C)}] \quad (\because L = Ra \cdot Rc \cdot Cb \cdot Rx/Rd) \quad (3)$$

At this time, the gain characteristic has a peak at the resonance frequency f0, showing that of a band-pass filter that has the frequency f0 as the center frequency of the passband. The phase characteristic exhibits an abrupt rotation near the resonance frequency f0. On the other hand, when the capacitance of the capacitor 10 has changed to C+ΔC, the resonance frequency of the resonant circuit is given by $$f0' = 1/[2\pi\sqrt{[L \cdot (C + \Delta C)]}] \quad (4)$$

As shown above, a change in the capacitance of the capacitor 10 causes a variation in the resonance frequency of the resonant circuit. For example, when ΔC>0, the relation f0>f0' holds, and the resonance frequency is lowered. That is, as shown in FIG. 3, as the capacitance of the capacitor 10 is changed by ΔC, the transfer characteristics change from the status denoted with the solid line to the status depicted with the broken line. Now, focus is brought into the phase characteristic. Assume that Φ is the phase difference at the frequency f0 between the reference phase signal V1(t) and the resonant signal V2(t) when the capacitance of the capacitor 10 is C. The phase difference at the frequency f0 when the capacitance of the capacitor 10 is C+ΔC changes from Φ to Φ' by ΔΦ. Accordingly, when the frequency of the reference phase signal V1(t) is fixed to f0 (=1/[2π√(L·C)]), a change by ΔC in the capacitance of the capacitor 10 causes a variation by ΔΦ in the phase difference between the reference phase signal V1(t) and the resonant signal V2(t). The phase difference ΔΦ depends on the variation ΔC in the capacitance of the capacitor 10 being measured. The capaciatance detector of the present invention is designed to detect the capacitance of the capacitor 10 by detecting the phase difference ΔΦ between the reference phase signal V1(t) having a fixed frequency and the resonant signal V2(t) whose phase varies in response to a change in the capacitance being measured.

The phase comparator 50 creates a phase difference signal V3(t) having a signal level dependent upon the phase difference between the reference phase signal V1(t) and the resonant signal V2(t). For example, the phase comparator 50 may be formed of a double balanced mixer, and serves as a multiplier, so that it outputs a DC voltage corresponding to the phase difference between two input signals when the signals have the same transmission frequency. The phase difference between the reference phase signal V1(t) and the resonant signal V2(t) varies according to the capacitance of the capacitor 10, the signal level of the phase difference signal V3(t) is dependent upon the capacitance of the capacitor 10 as described above. This means that the capacitance of the capacitor 10 has been electrically detected by means of the phase difference signal V3(t).

There is also provided a subtracter 60, which receives the phase difference signal V3(t) and a target phase difference signal serving as the target value of the phase difference signal V3(t). The subtracter 60 subtracts the phase difference signal V3(t) from the target phase difference signal to output the resulting signal as an error signal. That is, the error signal is indicative of a shift from the target value of the phase difference between the reference phase signal V1(t) and the resonant signal V2(t). As the target phase difference signal, for example, the center value of the phase characteristic shown in FIG. 3 can be employed. There is also provided a controller 70, which integrates the error signal supplied from the subtracter 60 for output as a control signal, which is in turn supplied to the variable resistor 30.

The variable resistor 30 is designed to change its resistance value in response to a control signal supplied from the controller 70. FIGS. 4(a) to (c) show an exemplary configuration of the variable resistor 30. For example, as shown in FIG. 4(a), the variable resistor 30 is formed of a plurality of resistors R01 to R05 having mutually different resistance values and disposed in parallel to each other, and a switch circuit connected to each of these resistors in series. The variable resistor 30 is designed such that one or more switches to be activated are selected based on the control signal supplied from the controller 70. The selected switches are thus turned ON, thereby allowing any one or more of the resistors R01 to R05 to be connected at the contact 2 to the impedance conversion circuit 20. That is, the variable resistor 30 allows a switch connected to each of the resistors R01 to R05 to be selectively activated, thereby varying the resistance value. Note that as shown in FIG. 4(b), the variable resistor 30 may also be formed of a plurality of resistors R01 to R05 connected in series with each other and a plurality of switches each connected in parallel to each of these resistors. Even in this case, at least one switch can be selectively deactivated, thereby allowing for varying the resistance value of the variable resistor 30. Furthermore, as shown in FIG. 4(c), the variable resistor 30 may also be formed of a gate bias circuit that creates a gate bias voltage based on the control signal and a junction FET. The junction FET varies its source-drain resistance in response to the gate bias voltage, thus serving as a variable resistor.

The capaciatance detector of the present invention provides operational effects as follows. First, the combination of the impedance conversion circuit 20 and the variable resistor 30 serves as an equivalent inductor, which constitutes an equivalent LC parallel resonant circuit in conjunction with the capacitor 10 to be measured. That is, the capaciatance detector of the present invention can provide a resonant circuit without using a coil, thereby readily making use of LSI semiconductor processes. Such a resonant circuit may be applied with the reference phase signal V1(t) that resonates at a frequency near the resonance frequency f0, thereby allowing the resonant signal V2(t) to be extracted from the contact 1 of the resonant circuit. The resonant signal V2(t) has the same frequency as the reference phase signal V1(t) and yields a phase difference relative to the reference phase signal V1(t) depending on the capacitance of the capacitor 10 to be measured. Such a phase difference is converted by the phase comparator 50 into a voltage level, which is then delivered as the phase difference signal V3(t). Since the capacitance value of the capacitor 10 is reflected on the voltage level of the phase difference signal V3(t), the phase difference signal V3(t) allows the capacitance being measured to be detected as an electric signal. Here, the resonant circuit can be provided with a high Q value setting, thereby enhancing the capacitance sensitivity. The higher the Q value setting for the resonant circuit, the sharper the gain peak in the transfer characteristics shown in FIG. 3 and the more abrupt the phase shift near the resonance frequency f0. This results in an increase in the variation width ΔΦ in the phase difference between the reference phase signal V1(t) and the resonant signal V2(t) with respect to the change ΔC in the capacitance of the capacitor 10. Here, the Q value of the resonant circuit including the resistor R1 can be expressed by $$Q = R1 \cdot \sqrt{(C/L)} \quad (\because L = Ra \cdot Rc \cdot RX \cdot Cb/Rd) \quad (5)$$

As can be seen in Equation (5), the Q value of the resonant circuit can be set to a high value by increasing the resistor R1. That is, according to the capaciatance detector of the present invention, the setting of the Q value makes it easier to improve the capacitance sensitivity. However, the higher the Q value setting, the narrower the detectable capacitance range, i.e., the input dynamic range. Accordingly, the capacitance range to be detected is preferably taken into account for setting of constants. In the capaciatance detector of the present invention, the optimum Q value can be set depending on the object to be measured.

Figure 5:
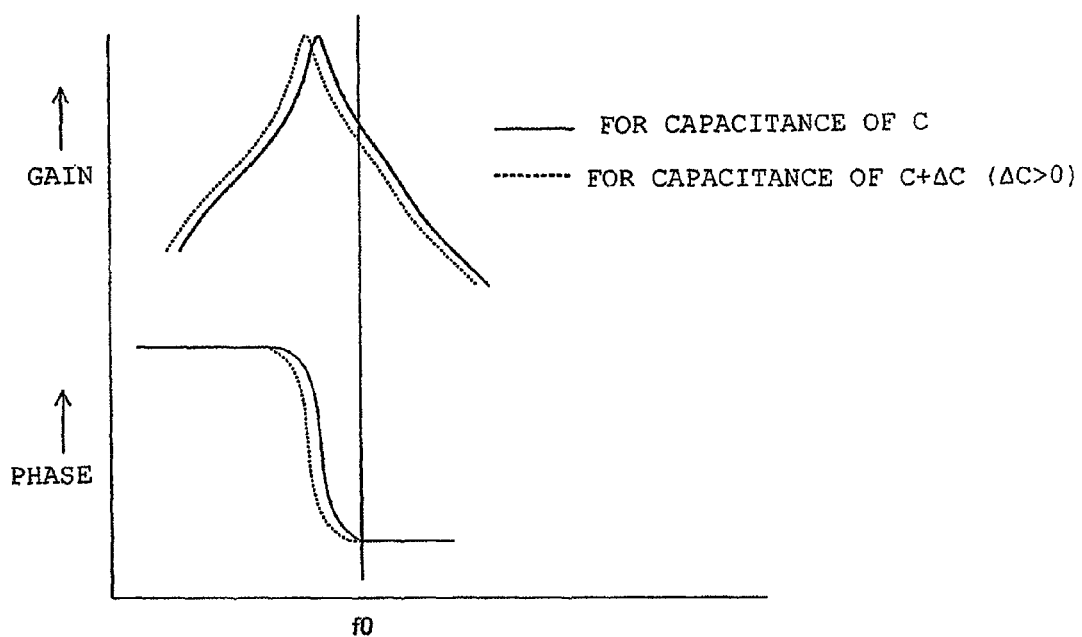
FIG. 5 is a view illustrating frequency transfer characteristics when the capacitance of a measured object varies

On the other hand, suppose that the capacitor 10 to be measured has greatly changed in its capacitance due to the ambient temperature. This change in turn causes the resonance frequency of the resonant circuit to accordingly vary, so that the transfer characteristics of the resonant circuit shown in FIG. 3 vary, for example, as shown in FIG. 5. That is, in this case, the frequency of the reference phase signal $V1(t)$ applied to the resonant circuit deviates from the resonance frequency of the resonant circuit. Thus, even when the reference phase signal $V1(t)$ is applied to the resonant circuit, the phase difference between the reference phase signal $V1(t)$ and the resonant signal $V2(t)$ does not vary in response to a change $\Delta C$ in the capacitance of the capacitor 10. That is, the phase difference variation $\Delta\Phi$ shown in FIG. 3 cannot be observed, thereby disabling the detection of capacitance. In this context, the capaciatance detector of the present invention is designed so that the resistance value of the variable resistor 30 is tracked and changed to compensate for such a variation in the resonance frequency of the resonant circuit caused by a significant variation in the capacitance of the capacitor 10. Thus, when there occurs a deviation between the resonance frequency of the resonant circuit and the frequency of the reference phase signal $V1(t)$, the detector provides control such that the resonance frequency already varied is aligned with the frequency of the reference phase signal $V1(t)$. That is, as can be seen clearly in Equation (3), the resonance frequency of the resonant circuit can be regulated by controlling the L value ($L=Ra \cdot Rc \cdot Cb \cdot Rx/Rd$). The capacitance measuring device of the present invention provides feedback control of the resistance value Rx of the variable resistor 30, thereby aligning the resonance frequency varied by a change in the capacitance of the capacitor 10 with the frequency of the reference phase signal $V1(t)$. In this manner, the detector maintains its capacitance sensitivity.

For example, suppose that the capacitor 10 to be measured has been varied to increase its capacitance due to a variation in ambient temperature. This causes the resonance characteristic of the resonant circuit to vary, thereby lowering the resonance frequency as described above. When the resonance frequency of the resonant circuit is reduced to cause a deviation from the frequency of the reference phase signal $V1(t)$, the signal level of the phase difference signal $V3(t)$ is reduced from the target value indicated by the target phase difference signal. The target phase difference signal is set to, for example, the center value of the phase characteristic of FIG. 3, that is, the center value of those which the phase difference signal $V3(t)$ can take on. The subtracter 60 subtracts the phase difference signal $V3(t)$ from the target phase difference signal, thereby creating a negative error signal having a signal level corresponding to the amount of deviation from the target value of the phase difference signal $V3(t)$. The resulting error signal is then supplied to the controller 70. The controller 70 integrates the error signal and then supplies it as a control signal to the variable resistor 30. The variable resistor 30 selectively activates a switch based on the polarity and the signal level of the control signal. The resistor associated with the activated switch is connected at the contact 2 to the impedance conversion circuit 20, thereby determining the resistance value Rx. At this time, the resistance value Rx is controlled to decrease so that the signal level of the phase difference signal $V3(t)$ agrees with the target phase difference signal. This causes an increase in the resonance frequency of the resonant circuit which has been reduced due to a variation in the capacitance of the capacitor 10. Thus, the resonance frequency is regulated so as to agree generally with the frequency of the reference phase signal $V1(t)$, thereby maintaining the capacitance sensitivity.

As described above, the capaciatance detector of the present invention is configured such that the resonant circuit includes the equivalent inductor of the impedance conversion circuit 20. This configuration allows not only for implementing high integration but also for providing control to resonance frequency in response to a variation in the capacitance being measured. It is thus possible to provide highly sensitive capacitance detection.

This embodiment is configured such that the resistance value Rx of the variable resistor 30 connected in series with the impedance conversion circuit 20 is varied in response to a variation in the resonance frequency of the resonant circuit. However, as can be seen clearly in Equation (3), this operation can also be implemented by replacing the resistors Ra, Rc, and Rd or the capacitor Cb of the impedance conversion circuit 20 by variable resistors or a variable capacitor and providing control to their resistance or capacitance value. For example, the values of Ra, Rb, and Cb can be reduced, thereby increasing the resonance frequency of the resonant circuit.

Second Embodiment

Figure 6:
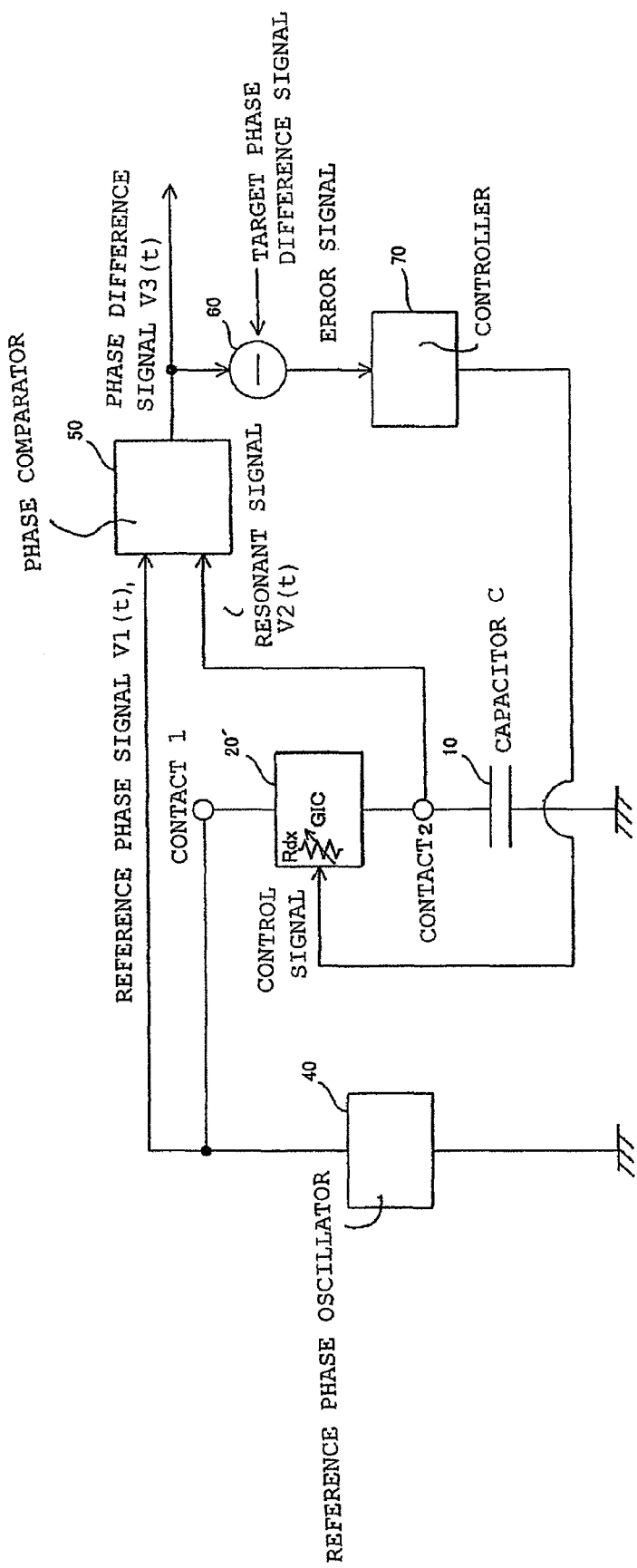
FIG. 6 is a block diagram illustrating a capaciatance detector according to a second embodiment of the present invention.

FIG. 6 shows a capaciatance detector according to a second embodiment of the present invention. The capaciatance detector of this embodiment is different from the aforementioned first embodiment in the configuration of the resonant circuit. That is, the resonant circuit of this embodiment is configured such that the capacitor 10 to be measured is connected at the contact 2 in series with the impedance conversion circuit 20'. Such a resonant circuit is applied from the reference phase oscillator 40 to the contact 1 with the reference phase signal $V1(t)$ that oscillates at the resonance frequency f0 of the resonant circuit, allowing the resonant signal $V2(t)$ to be extracted from the contact 2.

Figure 7:
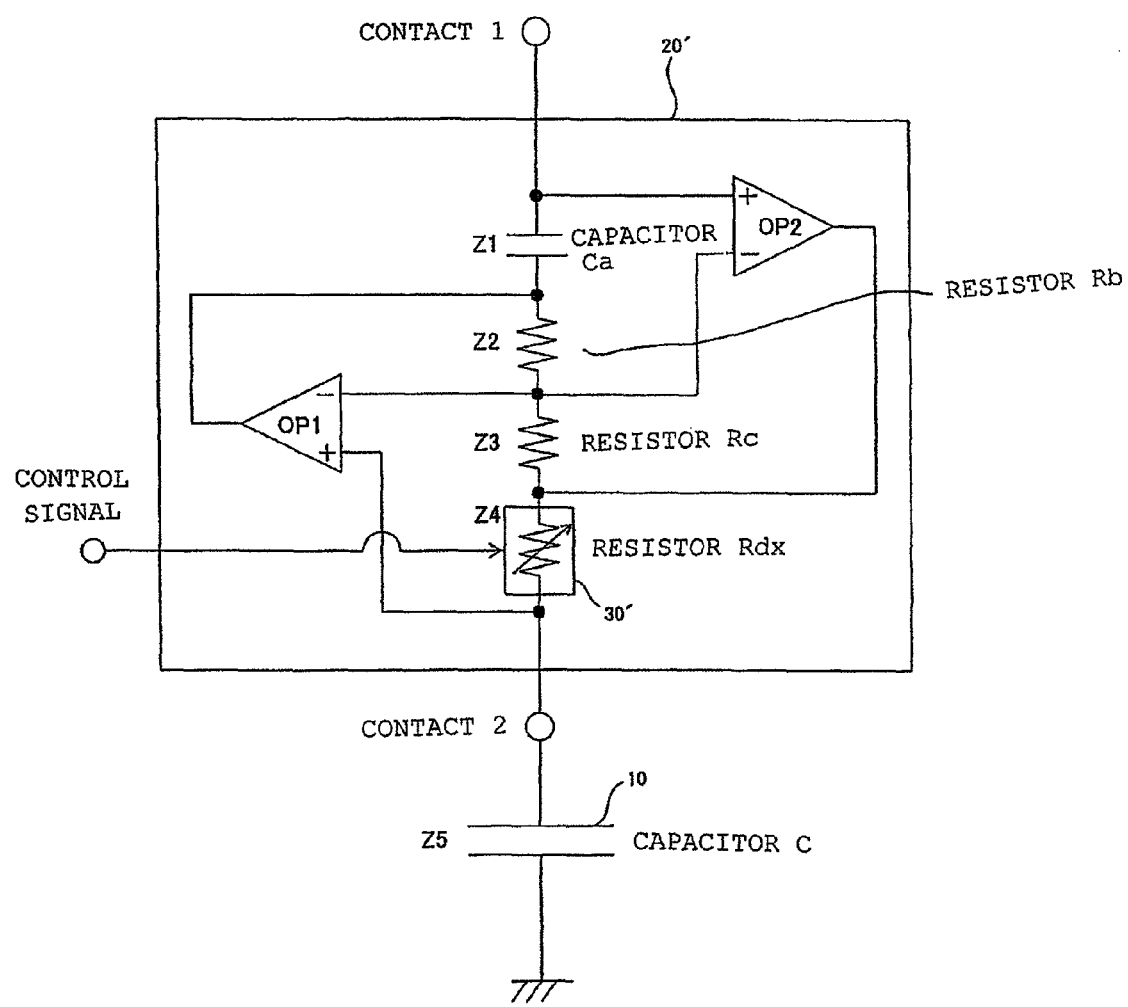
FIG. 7 is an equivalent circuit diagram illustrating an impedance conversion circuit according to the second embodiment of the present invention.

FIG. 7 shows an example equivalent circuit diagram of the impedance conversion circuit 20' connected at the contact 2 with the capacitor 10. The internal configuration of the impedance conversion circuit 20' according to this embodiment is slightly different from that of the aforementioned first embodiment. That is, the impedance conversion circuit 20' is formed, between the contact 1 and the contact 2, of resistors Rb, Rc, and Rdx and a capacitor Ca, connected in series with each other; and operational amplifiers OP1 and OP2 connected to these passive components. The resistor Rdx includes a variable resistor 30' whose resistance value is to vary in response to a control signal supplied from a controller 70. When viewed from the contact 1, the combined impedance Zx2 of the resonant circuit formed of the impedance conversion circuit 20' and the capacitor 10 can be expressed by $$Zx2 = Z1 \cdot Z3 \cdot Z5/(Z2 \cdot Z4) \tag{6}$$

Substituting impedance values corresponding to Z1 through Z5 into Equation (6) above gives $$Zx2 = -Rc/[(Rb \cdot Rdx \cdot Ca \cdot C) \cdot \omega^2] = -1/D\omega^2 (\because D = (Rb \cdot Rdx \cdot Ca \cdot C)/Rc) \tag{7}$$

That is, when viewed from the contact 1, it can be seen that the impedance Z×2 of the resonant circuit is inversely proportional to the square of an angular frequency ω, and a frequency dependent negative resistor (or Frequency Dependent Negative Resister (FDNR)) having a negative coefficient.

Figure 8:
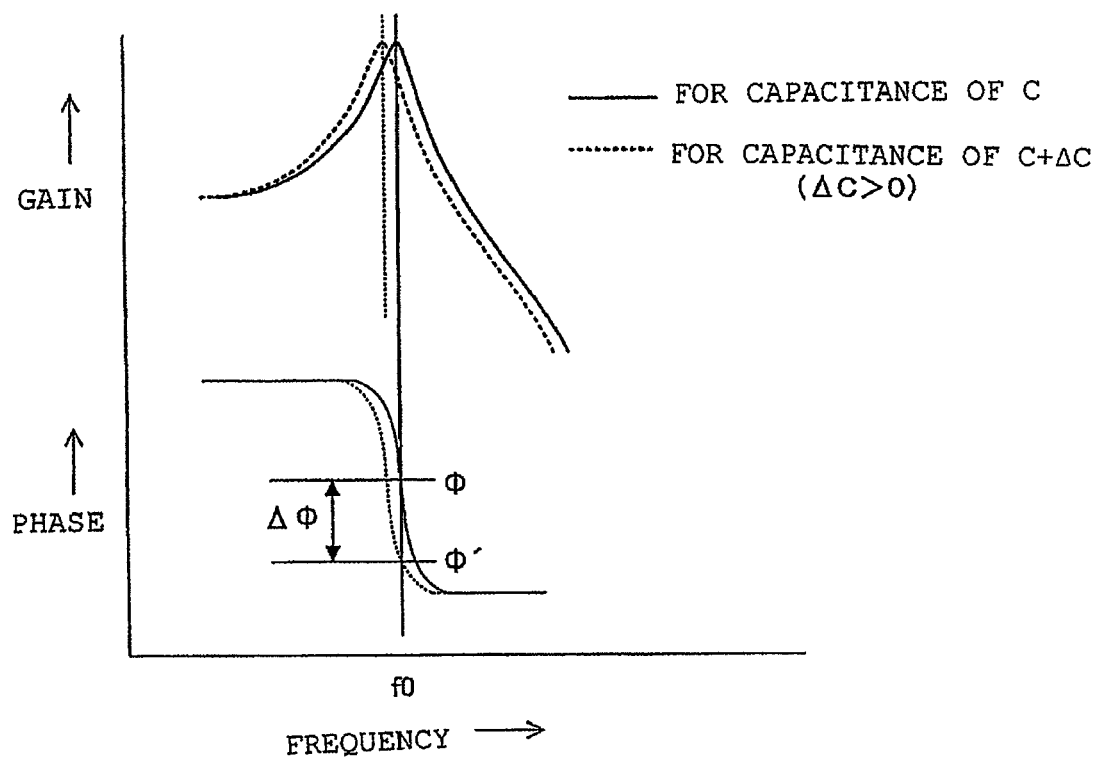
FIG. 8 is a view illustrating frequency transfer characteristics of a resonant circuit according to the second embodiment of the present invention.

FIG. 8 shows the frequency transfer characteristics from the reference phase signal V1(t) to the resonant signal V2(t) of the resonant circuit formed of a frequency dependent negative resistor. As with the aforementioned first embodiment, the phase characteristic shows an abrupt rotation at the resonance frequency f0 of the resonant circuit. The gain characteristic is the same as that of the first embodiment in that it has a peak near the resonance frequency, but is different in that it has a DC gain on the lower frequency side and a low-pass filter gain characteristic. Such transfer characteristics are the same as those of the LC serial resonant circuit that includes a capacitor and an inductor connected in series. That is, the impedance conversion circuit 20' is connected in series with the capacitor 10 to provide a frequency dependent negative resistor, thereby implementing an equivalent LC serial resonant circuit.

Even when the resonant circuit is formed as described above, the resonant signal V2(t) extracted from the contact 2 is phase modulated according to the capacitance to be measured, enabling the detection of capacitance based on the phase difference between the resonant signal V2(t) and the reference phase signal V1(t). Note that the capacitance detection principle is the same as that of the aforementioned first embodiment and thus will not be explained repeatedly.

Here, the resonance angular frequency ω0 of the resonant circuit according to this embodiment can be expressed by $$\omega 0 = 1/\sqrt{(R3 \cdot D)} \ldots (\because D = (Rb \cdot Rdx \cdot Ca \cdot C)/Rc) \quad (8)$$

Thus, the resonance frequency can be regulated by providing feedback control to the resistance value Rdx of the variable resistor 30' disposed within the impedance conversion circuit 20'. Accordingly, when the capacitance C of the capacitor 10 to be measured has greatly varied due to a change in ambient temperature, the resonance frequency can be compensated by controlling the resistance value of the variable resistor 30'. The second embodiment is the same as the aforementioned first embodiment except for the configuration of the resonant circuit, the extraction point of the resonant signal V2(t), and the arrangement of the variable resistor 30'. Thus, the phase comparator 50 employs the phase difference signal V3(t) having a signal level corresponding to the phase difference between the reference phase signal V1(t) and the resonant signal V2(t) to detect the capacitance of the capacitor 10 to be measured. The method for compensating for a variation in the resonance frequency caused by a change in the capacitance of the capacitor 10 is the same as that of the aforementioned first embodiment, and thus will not be explained repeatedly.

In this embodiment, the impedance Z4 within the impedance conversion circuit 20' of FIG. 7 is made up of the variable resistor 30', so that its resistance value Rdx is varied in response to a change in the resonance frequency of the resonant circuit. Alternatively, the resistors Rb and Rc and the capacitor Ca which constitute the impedance conversion circuit 20' may also be formed of a variable resistor and a variable capacitor to control their resistance and capacitance values to provide the same effects.

It is known that the ideal FDNR circuit can provide an infinite Q value to the resonant circuit. In actual circuits, the Q value takes on a specified value due to the stray capacitance caused by wiring or the limitation on the gain of the operational amplifier. Nevertheless, the Q value can be readily increased as compared with a resonant circuit of coils according to a conventional example. As a result, as shown in FIG. 8, the phase shift near the resonance frequency f0 can be designed to be abrupt. This allows a greater phase shift ΔΦ for a change in capacitance C, thereby enhancing sensitivity. It is thus possible to easily implement a highly sensitive sensor.

Example Application 1

Figure 9:
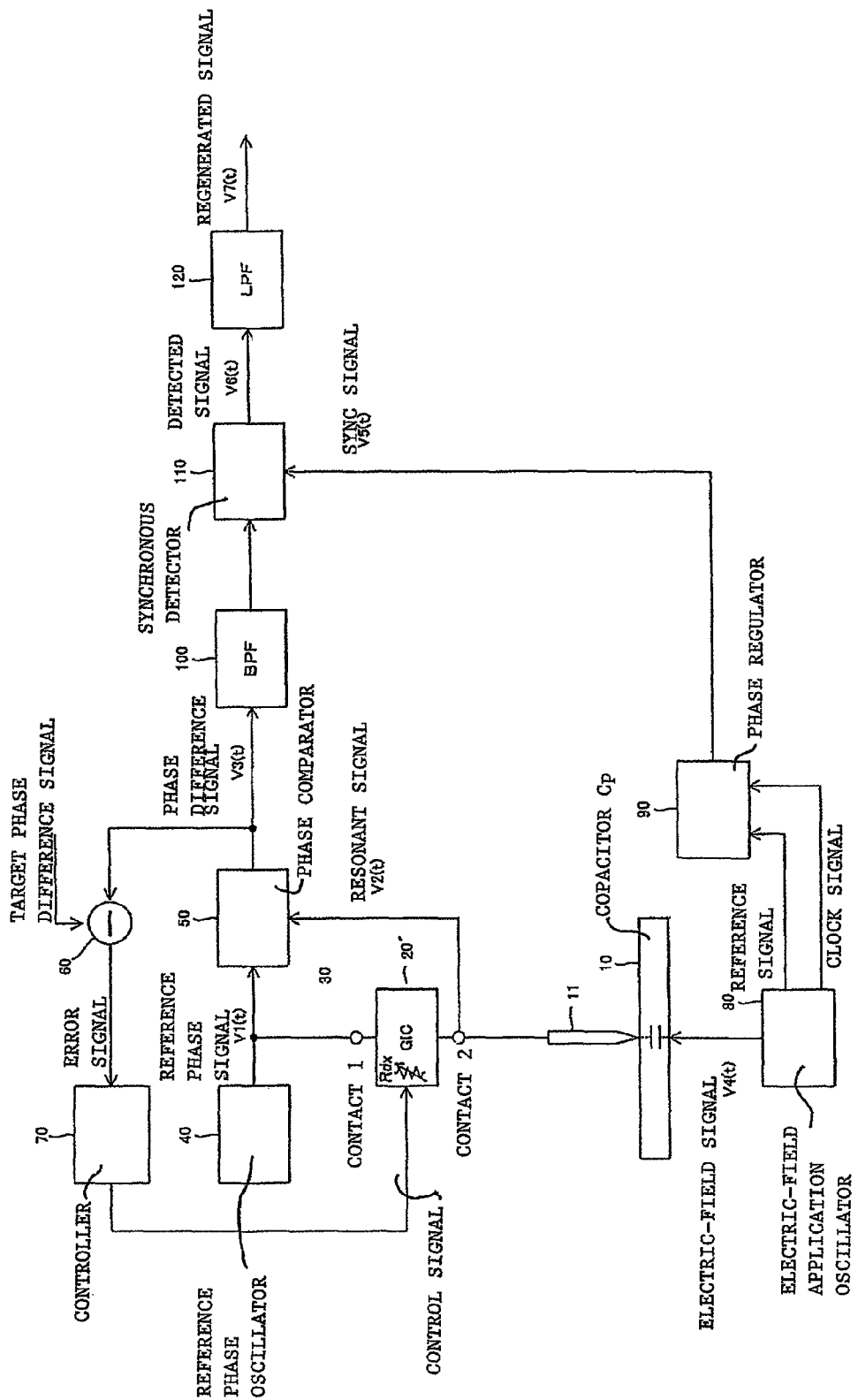
FIG. 9 is a block diagram illustrating a polarization orientation detector for ferroelectric material to which a capaciatance detector of the present invention is applied.

FIG. 9 shows a block diagram illustrating a polarization orientation detector for ferroelectric material to which the capaciatance detector of the present invention is applied. Illustrated is a medium 10, which is to be measured by the polarization orientation detector of this embodiment and is made of a ferroelectric material, for example, $LiTaO_3$. The medium 10 can be applied with an electric field greater than its coercive electric field from outside to thereby change the polarization orientation. The polarization orientation of the medium 10 can be determined according to data, thereby recording data on the medium 10. That is, the polarization orientation detector of the present invention is designed to detect the polarization orientation of the ferroelectric material. This design allows for using the detector as a reproduction device to reproduce data recorded on the medium 10. The polarization orientation of the medium 10 is reflected on the nonlinear permittivity of the ferroelectric material, i.e., the capacitance Cp of the capacitor C formed within the medium.

There is disposed a probe 11 with its tip in contact with or in close proximity to the medium 10. When the medium 10 is applied with an electric-field signal V4(t), the capacitance Cp of the capacitor C immediately underneath the probe 11 varies, so that the change is read with the probe 11 to read recorded data. Note that the medium 10 may be, for example, rotated to produce a relative positional movement between the probe 11 and the medium 10 if the medium 10 has a disc-like shape. Alternatively, if the medium 10 has a card-like shape, either one of the probe 11 and the medium 10 may be allowed to move linearly, thereby providing the relative motion. The probe 11 is connected with the aforementioned capacitance measuring device of the present invention. That is, the probe 11 is connected at the contact 2 to the impedance conversion circuit 20'. The impedance conversion circuit 20' has the same internal configuration as that shown in FIG. 7, in which the variable resistor 30' is included so that the resistance value Rdx is changed in response to the control signal. The impedance conversion circuit 20' is connected via the probe 11 with the capacitor C formed in the medium 10. This configuration allows for forming a frequency dependent negative resistor, thereby implementing an equivalent LC serial resonant circuit formed of the impedance conversion circuit 20' and the capacitor C.

The reference phase oscillator 40 generates the reference phase signal V1(t) that oscillates at the resonance frequency f0 of the aforementioned resonant circuit, and supplies the resulting signal to the resonant circuit as well as the phase comparator 30. The reference phase signal V1(t) applied to the resonant circuit is extracted as the resonant signal V2(t) from the contact 2 and then supplied to the phase comparator 30.

The phase comparator 50 produces the phase difference signal V3(t) having a signal level corresponding to the phase difference between the reference phase signal V1(t) and the resonant signal V2(t) and then supplies the resulting signal to the subtracter 60 and a band-pass filter 100.

The band-pass filter 100 is a band-pass filter (BPF) having, as its passband, the oscillation frequency fe of the electric-field signal V4(t) delivered from an electric-field application oscillator 80, to be discussed later. The band-pass filter 100 extracts only the frequency component equivalent to the electric field application frequency fe from the output signal of the phase comparator 50 and supplies the resulting component as an output signal to a synchronous detector 50.

The electric-field application oscillator 80 produces the sine-wave shaped electric-field signal V4(t) oscillating at the oscillation frequency fe that is sufficiently lower than the oscillation frequency f0 of the reference phase signal V1(t) and then supplies the resulting signal from the rear side of the medium 10. Thus, the alternating electric field for reading data recorded on the medium 10 is applied across the capacitor C immediately underneath the probe 11.

Figure 10:
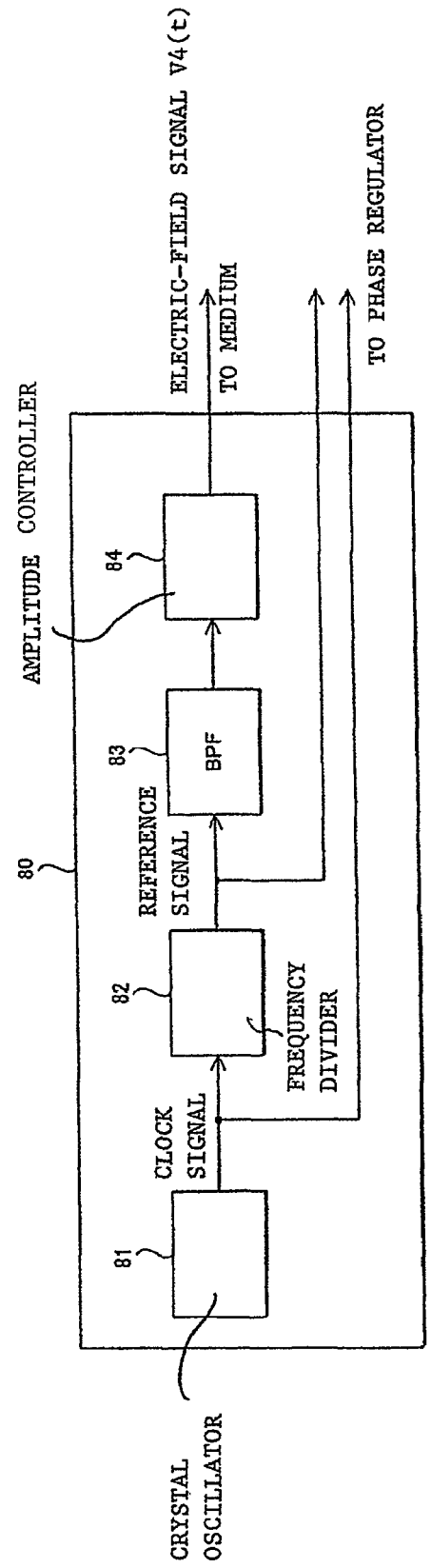
FIG. 10 is a block diagram illustrating in more detail the configuration of an electric-field application oscillator.

FIG. 10 is a block diagram illustrating in more detail the configuration of the electric-field application oscillator 80. The electric-field application oscillator 80 is made up of a crystal oscillator 81, a frequency divider 82, a band-pass filter 83, and an amplitude regulator 84. The crystal oscillator 81 produces, for example, a clock signal at a stable oscillation frequency of 10 MHz and supplies the resulting signal to the frequency divider 82 and a phase regulator 90 to be described later. The frequency divider 82 divides an input clock signal, for example, into 1/1000 and outputs a reference signal at a frequency of 10 KHz, which is then supplied to the band-pass filter 83 and the phase regulator 90 to be described later. The band-pass filter 83 has the oscillation frequency fe of the electric-field signal V4(t) as a passband and shapes the square-wave-shaped reference signal into a sine wave. That is, since the square-wave-shaped reference signal contains various frequency components, applying the signal directly to the medium 10 as the electric-field signal is unfavorable in highly accurate signal detection. In this context, the square-wave-shaped reference signal is converted into a single frequency signal through the band-pass filter 83, thereby providing improved signal sensitivity. The amplitude controller 83 regulates the amplitude and the offset voltage of the sine-wave-shaped signal to produce, for example, the electric-field signal V4(t) with an amplitude of +/−5 V and a frequency of 10 KHz, which is then supplied to the medium 10. The amplitude control circuit 84 is operated to regulate the level of the electric-field signal V4(t), thus allowing an alternating electric field of an appropriate strength to be applied to the medium 10. More specifically, the electric-field signal V4(t) is regulated by the amplitude control circuit 84 to have an amplitude level that is required to read data recorded on the medium 10 but is not sufficient to write data thereon.

The phase regulator 90 produces a sync signal V5(t) obtained by adding a given delay time Td to the reference signal received from the electric-field application oscillator 80, and then supplies the resulting signal to a synchronous detector 110. More specifically, the phase regulator 90 is made up of a shift register for phase shifting the phase of the reference signal based on the clock signal supplied from the electric-field application oscillator 80, thereby creating the sync signal V5(t). The delay time Td is set, for example, to the time required for synchronous detection with the synchronous detector 110 from the point in time at which the electric-field signal V4(t) is output.

Figure 11:
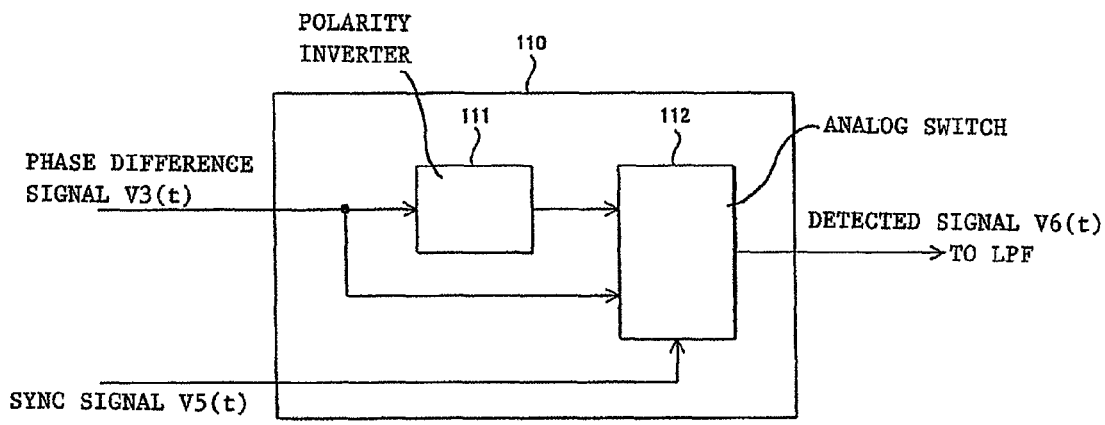
FIG. 11 is a block diagram illustrating in more detail the configuration of a synchronous detector.

The synchronous detector 110 synchronously detects the phase difference signal V3(t) in sync with the sync signal V5(t), and then outputs and supplies the resulting signal as a detected signal V6(t) to a low-pass filter 120. FIG. 11 shows a block diagram illustrating in more detail the configuration of the synchronous detector 110. The synchronous detector 110 includes a polarity inverter 111 and an analog switch 112. The phase difference signal V3(t) having only an electric field application frequency fe component extracted by the band-pass filter 100 is separately supplied to the polarity inverter 111 and the analog switch 112. The polarity inverter 111 inverts the polarities of the phase difference signal V3(t) and supplies the resulting signal to the analog switch 112. That is, the analog switch 112 receives the signal whose polarity has been inverted via the polarity inverter 111 as well as the signal which has not passed through the polarity inverter 111 with its original polarity unchanged. Furthermore, the analog switch 112 also receives the sync signal V5(t) from the phase regulator 90. The analog switch 112 employs the sync signal V5(t) as a control signal. For example, when the sync signal V5(t) is at a high level, the analog switch 112 outputs the non-inverted phase difference signal V3(t) as the detected signal V6(t). On the other hand, when the sync signal V5(t) is at a low level, the analog switch 112 outputs the inverted phase difference signal V3(t) as the detected signal V6(t). The analog switch 112 forms a so-called chopper circuit to detect only the component of the phase difference signal V3(t) synchronized with the sync signal V5(t) and then output the resulting signal as the detected signal V6(t).

The low-pass filter 120 removes the electric field application frequency (fe) component or a harmonic component from the detected signal V6(t) to create a regenerated signal V7(t).

The principle of detecting the polarization orientation of a ferroelectric material according to this embodiment is as follows. First, the electric-field signal V4(t) delivered from the electric-field application oscillator 80 is applied to the medium 10 from its rear side. This causes an alternating electric field to be applied at a frequency of fe across the capacitor C that is formed immediately underneath the probe. The application of the alternating electric field to the medium 10 causes a change in the nonlinear permittivity of the medium 10. This is followed by a change in the capacitance Cp of the capacitor C immediately underneath the probe 11. The aspect of change in the capacitance Cp caused by the application of the alternating electric field depends on the polarization status of the medium 10. More specifically, assuming that Cpp is the capacitance for a positive electric-field signal V4(t) and Cpn is the capacitance for a negative one, the relation of magnitude between Cpp and Cpn is reversed depending on the polarization orientation of the medium 10. In other words, as the polarity of the electric-field signal V4(t) changes, the capacitance Cp immediately underneath the probe 11 may vary in an entirely different manner, i.e., increase or decrease depending on the polarization orientation of the medium 10. The polarization orientation detector for ferroelectric material according to this embodiment detects the change in the capacitance Cp caused by the application of the electric-field signal V4(t) using the aforementioned capaciatance detector of the present invention. The polarization orientation detector thus detects the polarization orientation of the medium 10, that is, reads the data recorded on the medium 10. Note that the amount of change in capacitance Cp caused by the application of the electric-field signal V4(t) is on the order of aF (attoFarad=$10^{-18}$ F), only a trace amount of change in the capacitance to be detected.

Figure 12:
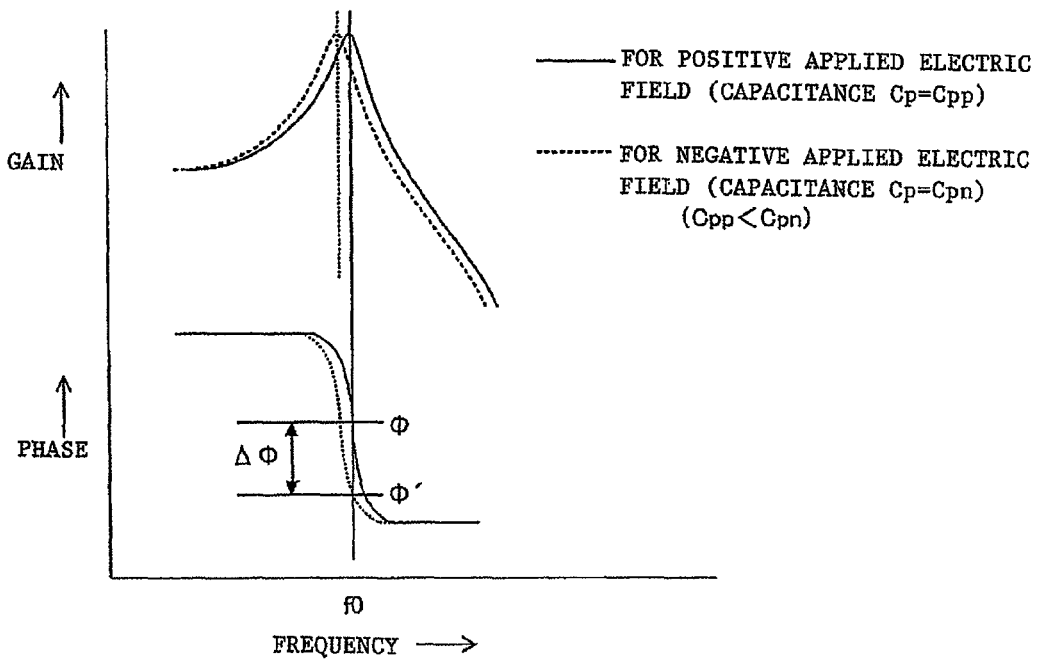
FIG. 12 is a view illustrating frequency transfer characteristics of a resonant circuit included in a polarization orientation detector.

FIG. 12 shows the frequency transfer characteristics of the resonant circuit, which is formed of the impedance conversion circuit 20' and the capacitor C, from the reference phase signal V1(t) to the resonant signal V2(t). As shown in FIG. 12, the transfer characteristics are the same as those shown in FIG. 8. In the case of this embodiment, applying an alternating electric field to the medium 10 causes a change in the capacitance Cp of the capacitor C formed immediately underneath the probe. As described above, the aspect of such a change in the capacitance Cp depends on the polarization orientation of the medium 10, i.e., the recorded data. For example, assuming that Cp=Cpp for a positive applied electric field and Cp=Cpn for a negative field, then Cpp<Cpn when the data stored on the medium 10 is "1" and Cpp>Cpn when the data stored on the medium 10 is "0". FIG. 12 shows the transfer characteristics when the data stored on the medium 10 is "1" and the relation Cpp<Cpn holds. In the figure, the transfer characteristics for a positive applied electric field (Cp=Cpp) are shown with a solid line, while the transfer characteristics are indicated with a dotted line for a negative applied electric field (Cp=Cpn). In this case, since Cpp<Cpn, the resonance frequency of the resonant circuit is reduced for a negative applied electric field as compared with a positive field, causing the phase of the resonant signal V2($t$) at the frequency f0 to be delayed by $\Delta\Phi$. On the other hand, although not illustrated, since Cpp>Cpn when the data recorded on the medium 10 is "0", the resonance frequency of the resonant circuit is increased for a negative applied electric field as compared with a positive field, causing the phase of the resonant signal V2($t$) at frequency f0 to be advanced by $\Delta\Phi$. That is, detecting a change in the phase of the resonant signal V2($t$) during the application of the alternating electric field makes it possible to detect the polarization orientation of the medium 10, thereby allowing for reading the recorded data. The polarization orientation detector according to this embodiment detects such a change in the phase of the resonant signal V2($t$) by comparing its phase with that of the reference phase signal V1($t$), thereby detecting the polarization orientation of the medium 10, i.e., reading the recorded data.

Figure 13:
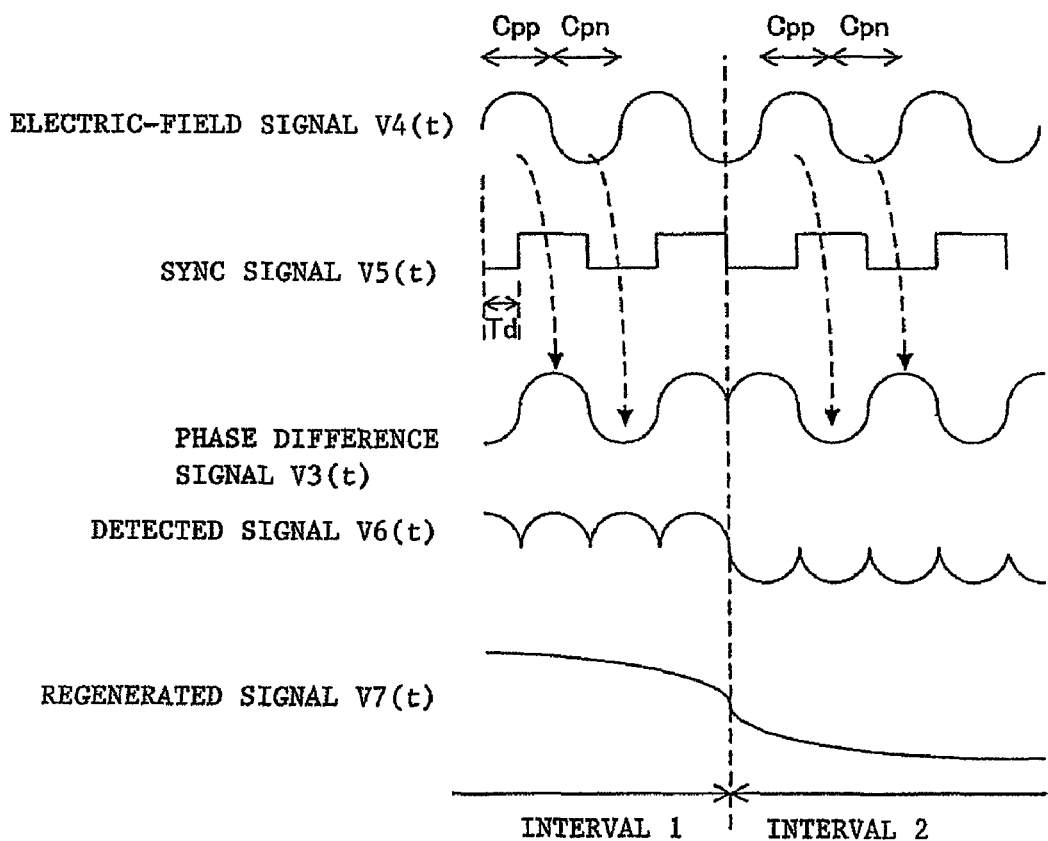
FIG. 13 is a timing chart of each signal created by a polarization orientation detector.

A description will now be made to the operation of the polarization orientation detector for ferroelectric material according to this embodiment with reference to the timing chart shown in FIG. 13. In FIG. 13, assume that intervals 1 and 2 show a polarization domain of the medium 10, with data "1" recorded in the interval 1 and data "0" recorded in the interval 2. That is, the medium 10 exhibits different polarization statuses which differ from each other depending on the respective pieces of data in the interval 1 and the interval 2. As shown in FIG. 13, the electric-field application oscillator 80 applies to the medium 10 a sine-wave shaped electric-field signal V4($t$) whose polarity varies periodically. As such, an alternating electric field is applied to the capacitor C of the medium 10 immediately underneath the probe 11, thereby causing changes in the capacitance Cp in response to the polarity of the applied alternating electric field. Here, when the electric-field signal V4($t$) has the positive polarity, the electric field is applied to the medium 10 in the positive direction, and the capacitance of the capacitor C at this time is defined as Cpp. When the electric-field signal V4($t$) has the negative polarity, the electric field is applied to the medium 10 in the negative direction, and the capacitance of the capacitor C at this time is defined as Cpn. As described above, the polarization orientations of the medium 10 in the interval 1 and the interval 2 are different from each other. Thus, the relation Cpp<Cpn is held in the interval 1 and the relation Cpp>Cpn in the interval 2. Accordingly, the resonance frequency of the resonant circuit changes along with the polarity of the applied alternating electric field to the medium 10, thereby causing the phase of the resonant signal V2($t$) to vary in response to the polarity of the applied alternating electric field. More specifically, in the interval 1, the phase of the resonant signal V2($t$) is delayed when the electric field is applied in the negative direction as compared with the electric field being applied in the positive direction. The phase comparator 30 creates an output signal having a signal level corresponding to the phase difference between the reference phase signal V1($t$) and the resonant signal V2($t$). However, since the phase of the reference phase signal V1($t$) is not varied, the output signal corresponds to the phase variation of the resonant signal V2($t$). That is, the phase difference signal V3($t$) exhibits in the interval 1 a high level corresponding to the application of the electric field to the medium 10 in the positive direction, and exhibits a low level corresponding to the application of the electric field in the negative direction. The band-pass filter (BPF) 100 has its passband set to the frequency fe of the electric-field signal V4($t$). The filter 100 extracts from the phase difference signal V3($t$) only those components that have been changed due to the application of the electric field and removes other frequency components as noise components to output the resulting signal.

On the other hand, in the interval 2, the phase of the resonant signal V2($t$) is delayed when the electric field is applied to the medium 10 in the positive direction as compared with the electric field being applied in the negative direction. Accordingly, as a result of a phase comparison made by the phase comparator 50 between the reference phase signal V1($t$) and the resonant signal V2($t$), the phase difference signal V3($t$) exhibits a low level corresponding to the application of the electric field to the medium 10 in the positive direction and exhibits a high level corresponding to the application of the electric field in the negative direction. Note that the phase difference signal V3($t$) has a propagation delay or a delay time Td relative to the electric-field signal V4($t$).

The phase regulator 90 produces the sync signal V5($t$) that has been delayed relative to the electric-field signal V4($t$) by the delay time Td equivalent to the propagation delay from the time of output of the electric-field signal V4($t$) to the synchronous detection for supply to the synchronous detector 110. As a result, the sync signal V5($t$) is in phase with the phase difference signal V3($t$) in the interval 1 but is 180 degrees out of phase with it in the interval 2.

The analog switch 112 constituting the synchronous detector 110 employs the sync signal V5($t$) as a control signal to output the non-inverted phase difference signal V3($t$) not having passed through the polarity inverter 111 when the sync signal is at a high level. On the other hand, when the sync signal is at a low level, the analog switch 112 outputs the phase difference signal V3($t$) whose polarity was inverted after having passed through the polarity inverter 111 to create the detected signal V6($t$). That is, in the interval 1, the synchronous detector 110 does not invert the high-level phase difference signal V3($t$) but inverts the low-level phase difference signal V3($t$), and outputs the resulting signal as the detected signal V6($t$). On the other hand, in the interval 2, the synchronous detector 110 inverts the high-level phase difference signal V3($t$) but does not invert the low-level phase difference signal V3($t$), and outputs the resulting signal as the detected signal V6($t$). As shown in FIG. 13, such a detected signal V6($t$) obtained through its signal processing by the synchronous detector 50 is formed only of a positive signal in the interval 1 and formed only of a negative signal in the interval 2. The detected signal V6($t$) is subjected to filtering with the low-pass filter 120 to remove its carrier component and to produce the reproduction signal V7($t$). The reproduction signal V7($t$) exhibits a high level in the interval 1 and a low level in the interval 2. That is, the data "1" and "0" stored on the medium 10 is detected as the difference in voltage level and reproduced in purely electrical sense. In other words, the polarization orientation of a ferroelectric material is detected purely electrically.

The polarization orientation detector for ferroelectric material of this embodiment is configured, for example, such that the probe 11 scans across the medium 10 to thereby detect the polarization orientation of the medium 10, i.e., to reproduce the recorded data. However, a change in reproduction position on the medium 10 also causes a variation in the capacitance Cp immediately underneath the probe. Such a change in the capacitance Cp does not result from the polarization orientation of the ferroelectric material, thus causing degradation in accuracy of reading data. That is, when the medium read position moves causing a change in the capacitance Cp, the resonance frequency f0 of the resonant circuit also changes. The change of the resonance frequency f0 causes a variation in the transfer function from the reference phase signal $V1(t)$ to the resonant signal $V2(t)$. At this time, when the frequency of the reference phase signal $V1(t)$ is constant, the center phase of the transfer characteristics is shifted, resulting in the phase sensitivity being degraded. That is, a deviation between the frequency of the reference phase signal $V1(t)$ and the resonance frequency of the resonant circuit causes a frequency region where there is no phase rotation, leading to a decrease in the phase shift of the resonant signal $V2(t)$ caused by the application of the alternating electric field. As a result, there is degradation in the polarization orientation sensitivity, that is, the accuracy of reading data. However, as described above, the capaciatance detector of the present invention provides feedback control to the resistance value Rdx of the variable resistor 30' in order to align, with the frequency of the reference phase signal $V1(t)$, the resonance frequency of the resonant circuit once varied by a change in the capacitance of the medium 10 being measured. Accordingly, even in the presence of a change in read position on the medium 10, the polarization orientation sensitivity is maintained.

As described above, the capaciatance detector of the present invention can be applied to the polarization orientation detector for ferroelectric material, thereby facilitating the device configuration as compared with a conventional device that employs an FM demodulator. Furthermore, the variation in the resonance frequency of the resonant circuit followed by a capacitance variation not caused by the application of the alternating electric field is compensated for by providing control to the variable resistance value. This allows the polarization orientation sensitivity, i.e., the accuracy of reproduction data to be maintained even in the presence of a change in the reproduction position. Note that in this embodiment, the impedance conversion circuit and the capacitor to be measured are connected in series with each other to form a frequency dependent negative resistor, thereby implementing an equivalent LC serial resonant circuit. However, as with the first embodiment described above, the impedance conversion circuit and the variable resistor may be used to form an equivalent inductor, and then the inductor and the capacitor to be measured may be connected in parallel, thereby forming an equivalent LC parallel resonant circuit.

Example Application 2

Figure 14:
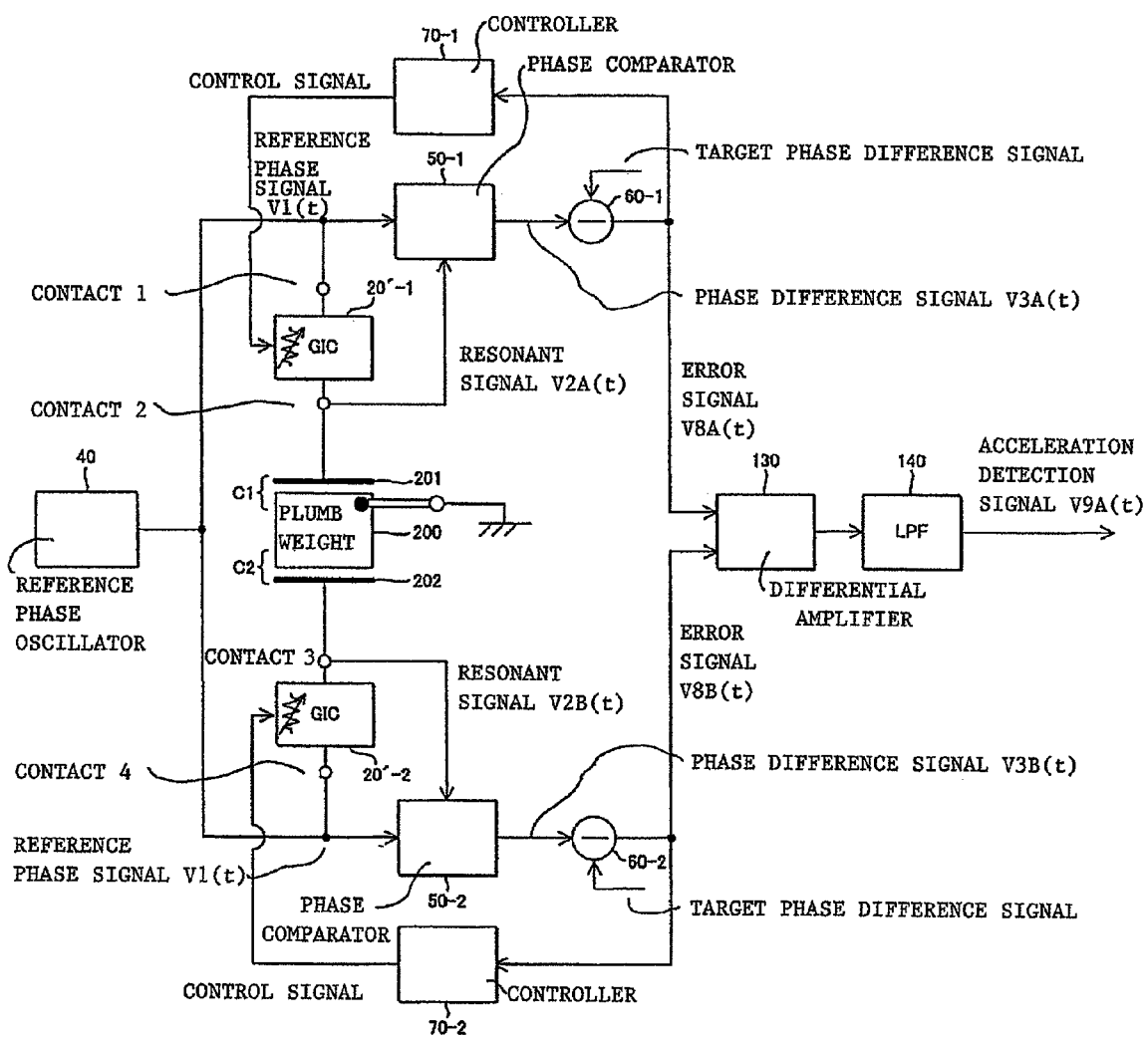
FIG. 14 is a block diagram illustrating an acceleration sensor to which a capaciatance detector of the present invention is applied.

FIG. 14 shows a block diagram illustrating an acceleration sensor to which the capaciatance detector of the present invention is applied. The acceleration sensor of this embodiment has a plumb weight 200 which is supported to be displaceable with given degrees of freedom, and detects the acceleration acting on the plumb weight 200 based on the displacement of the plumb weight 200. Such a displacement of the plumb weight 200 is detected based on the capacitance of the two capacitors C1 and C2 that are formed between the plumb weight 200 and a first electrode 201 and between the plumb weight 200 and a second electrode 202. The electrodes 201 and 202 are disposed opposite to each other across the plumb weight 200. The capacitances of the aforementioned two capacitors are detected individually by employing two capaciatance detectors of the present invention. A description will now be made in more detail to the configuration of the capaciatance detector according to this embodiment.

The plumb weight 200 and the first electrode 201 spaced apart therefrom form the capacitor C1. The capacitance of the capacitor C1 is determined by the gap length between the plumb weight 200 and the first electrode 201. The potential of the plumb weight 200 is fixed to the ground potential, while the first electrode 201 is connected at the contact 2 to the impedance conversion circuit 20'-1. The impedance conversion circuit 20'-1 has the same internal configuration as that shown in FIG. 7, in which the variable resistor 30' is included and the resistance value Rdx is designed to change in response to a control signal. The impedance conversion circuit 20'-1 is connected to the capacitor C1, thereby implementing a frequency dependent negative resistor that is formed of the impedance conversion circuit 20'-1 and the capacitor C1 and thus forming the first resonant circuit. On the other hand, the plumb weight 200 and the second electrode 202 spaced apart therefrom form the capacitor C2. The capacitance of the capacitor C2 is determined by the gap length between the plumb weight 200 and the second electrode 202. The second electrode 202 is connected at a contact 3 to the impedance conversion circuit 20'-2. The impedance conversion circuit 20'-2 also has the same internal configuration as that shown in FIG. 7, in which the variable resistor 30' is included and the resistance value Rdx is designed to change in response to a control signal. The impedance conversion circuit 20'-2 is connected to the capacitor C2, thereby implementing a frequency dependent negative resistor that is formed of the impedance conversion circuit 20'-2 and the capacitor C2 and thus forming the second resonant circuit. The aforementioned first and second resonant circuits are each applied with the reference phase signal $V1(t)$ singly by the reference phase oscillator 40. Thus, from the contact 2, a resonant signal $V2a(t)$ is extracted which has been phase modulated according to the capacitance of the capacitor C1 that constitutes the first resonant circuit, and then supplied to the phase comparator 50-1. The phase comparator 50-1 outputs a phase difference signal $V3a(t)$ having a signal level corresponding to the phase difference between the reference phase signal $V1(t)$ and the resonant signal $V2a(t)$. The phase difference signal $V3a(t)$ is supplied to a subtracter 60-1, and then the result of subtraction from the target phase difference signal is delivered as an error signal $V8a(t)$. On the other hand, from the contact 3, a resonant signal $V2b(t)$ is extracted which has been phase modulated according to the capacitance of the capacitor C2 that constitutes the second resonant circuit, and then supplied to the phase comparator 50-2. Thereafter, through the same processing as described above, an error signal $V8b(t)$ is delivered from the subtracter 60-2. The error signals $V8a(t)$ and $V8b(t)$ delivered from the capaciatance detectors different from each other are supplied to a differential amplifier 130. The differential amplifier 130 outputs a signal dependent on the difference between these two error signals. The output signal from the differential amplifier 130 is supplied to a low-pass filter 140 so that its noise component is removed, and then delivered as an acceleration detection signal $V9(t)$.

The capacitances of the capacitor C1 and the capacitor C2 vary depending on the spacing between the plumb weight 200 and the first electrode 201 and between the plumb weight 200 and the second electrode 202. When no acceleration acts upon the plumb weight 200, the capacitances are regulated to take on the same value (hereinafter referred to as the reference value). On the other hand, acceleration may act upon the plumb weight 200. In this case, if the capacitance of the capacitor C1 has been increased from the reference value, the capacitance of the capacitor C2 is decreased from the reference value. Conversely, when the capacitance of the capacitor C1 has been decreased from the reference value, the capacitance of the capacitor C2 is increased from the reference value. That is, when acceleration acts upon the plumb weight 200, the capacitances of the capacitor C1 and the capacitor C2 have a complementary relation, so that they take on mutually different capacitance values. As for the capacitances of the pair of the capacitors C1 and C2 having such a complementary relation, two capaciatance detectors of the present invention can be used for differential amplification of the shifts of each phase difference signal from their target values according to each capacitance. This allows for obtaining the acceleration detection signal $V9(t)$ corresponding to the acceleration having acted upon the plumb weight 200, thereby detecting the acceleration as an electric signal.

Here, the capacitor C1 and the capacitor C2 may unintentionally happen to have different capacitances due to variations in the manufacturing process. At this time, the first resonant circuit and the second resonant circuit have mutually different resonance frequencies. In contrast to this, the reference phase signal $V1(t)$ applied to the first and second resonant circuits is delivered singly from the reference phase oscillator 40, so that the frequency of the reference phase signal $V1(t)$ cannot be aligned to both the resonance frequencies. Accordingly, it is difficult to accurately detect the capacitance of both the capacitors C1 and C2. In this case, separate reference phase oscillators 40 may be conceivably provided for each resonant circuit in order to generate two reference phase signals which are consistent with the resonance frequencies of the resonant circuits, respectively. However, generating and operating asynchronous signals having different frequencies on the same LSI may cause a malfunction and thus may not be preferable. Here, in the capaciatance detector of the present invention, the impedance conversion circuits 20'-1 and 20'-2 each include the variable resistor 30', so that feedback control is provided to their resistance value Rdx, as described above, for the resonance frequencies of the two resonant circuits to agree with the frequency of the reference phase signal $V1(t)$. As such, the two resonant circuits that each contain the pair of the capacitors C1 and C2 having mutually different capacitances have resonance frequencies that generally coincide with each other. It is thus possible to detect capacitance with high accuracy using a single reference phase oscillator.

As described above, the capacitance detector of the present invention can be applied to an acceleration sensor for detecting acceleration based on the respective capacitances of a pair of capacitors having a complementary relation. This makes it possible to detect acceleration with high accuracy using a single reference phase oscillator. In this embodiment, an impedance conversion circuit and a capacitor to be measured are connected in series with each other to form a frequency dependent negative resistor, thereby implementing an equivalent LC serial resonant circuit. Alternatively, as described in relation to the aforementioned first embodiment, an impedance conversion circuit and a variable resistor may be used to form an equivalent inductor, which is then connected in parallel to a capacitor to be measured, thereby implementing an equivalent LC parallel resonant circuit.

Example Application 3

FIG. 15 shows a block diagram illustrating an angular velocity sensor to which the capaciatance detector of the present invention is applied. The angular velocity sensor of this embodiment is configured to detect an angular velocity applied to an oscillator 300 by detecting the displacement of the oscillator 300 along the Y-axis. This displacement is caused by Coriolis force acting thereon along the Y-axis when the oscillator 300 is rotated about the Z-axis while it is being oscillated along the X-axis. Such a displacement of the oscillator 300 along the Y-axis is detected as a change in capacitance as with the acceleration sensor according to the aforementioned embodiment.

There is disposed an excitation oscillator 150 which supplies an excitation signal $V10(t)$ for oscillating the oscillator 300 along the X-axis to an excitation electrode 303 and a phase regulator 160. The excitation signal $V10(t)$ has the frequency that is set to the resonance frequency f0$m$ equivalent to the natural frequency of the oscillator 300 along the X-axis. When the excitation signal $V10(t)$ is supplied to the excitation electrode 303, an electrostatic force induced between the oscillator 300 and the excitation electrode 303 causes the oscillator 300 to oscillate along the X-axis at the resonance frequency f0$m$. When the oscillator 300 experiences an angular velocity around the Z-axis while it is oscillating along the X-axis, the oscillator 300 is subjected to Coriolis force along the Y-axis corresponding to the magnitude of the given angular velocity. This is followed by the oscillator 300 being displaced along the Y-axis corresponding to the magnitude of the Coriolis force acting thereon.

The displacement along the Y-axis caused by the Coriolis force acting upon the oscillator 300 is detected as a change in capacitance. The detection method is the same as that for the aforementioned acceleration sensor. That is, there are provided a first electrode 301 and a second electrode 302 which are disposed opposite to each other along the Y-axis across the oscillator 300. This configuration forms a pair of capacitors C1 and C2 whose capacitances change complementarily in response to the displacement of the oscillator 300 along the Y-axis. The capacitance of the capacitor C1 is determined by the gap length between the oscillator 300 and the first electrode 301, while the capacitance of the capacitor C2 is determined by the gap length between the oscillator 300 and the second electrode 302. The first electrode 301 is connected at the contact 2 to the impedance conversion circuit 20'-1. The internal configuration of the impedance conversion circuit 20'-1 is the same as that shown in FIG. 7, in which the variable resistor 30' is included and the resistance value Rdx is designed to change in response to a control signal. The impedance conversion circuit 20'-1 is connected to the capacitor C1, thereby implementing a frequency dependent negative resistor made up of the impedance conversion circuit 20'-1 and the capacitor C1 and thus forming the first resonant circuit. On the other hand, the second electrode 202 is connected at the contact 3 to the impedance conversion circuit 20'-2. The internal configuration of the impedance conversion circuit 20'-2 is also the same as that shown in FIG. 7, in which the variable resistor 30' is included and the resistance value Rdx is designed to change in response to a control signal. The impedance conversion circuit 20'-2 is connected to the capacitor C2, thereby implementing a frequency dependent negative resistor formed of the impedance conversion circuit 20'-2 and the capacitor C2 and thus forming the second resonant circuit.

The aforementioned first and second resonant circuits are each applied with the reference phase signal $V1(t)$ singly from the reference phase oscillator 40. Thus, from the contact 2, the resonant signal $V2a(t)$ is extracted, which has been phase modulated according to the capacitance of the capacitor C1 that constitutes the first resonant circuit, and then supplied to the phase comparator 50-1. The phase comparator 50-1 outputs the phase difference signal V3a(t) having a signal level corresponding to the phase difference between the reference phase signal V1(t) and the resonant signal V2a (t). The phase difference signal V3a(t) is supplied to the subtracter 60-1, and then the result of subtraction from the target phase difference signal is delivered as the error signal V8a(t). Then, through the same processing as described above, the error signal V8b(t) is delivered from the subtracter 60-2 based on the capacitance of the capacitor C2.

The error signals V8a(t) and V8b(t) are supplied to band-pass filters 170-1 and 170-2, respectively. The band-pass filters 170-1 and 170-2 have their passband that is set to the aforementioned resonance frequency f0m, and extract only such frequency components equivalent to the resonance frequency f0m from the error signals V8a(t) and V8b(t) and then supply the resulting signals to synchronous detectors 180-1 and 180-2, respectively.

The phase regulator 160 produces a sync signal V11(t) which is obtained by adding a predetermined delay time Td to the excitation signal V10(t) supplied from the excitation oscillator 150, and then supplies the resulting signal to the synchronous detectors 180-1 and 180-2. For example, the delay time Td is set to the time that is required from the point in time at which the excitation signal is delivered from the excitation oscillator 150 until the synchronous detection is carried out by the synchronous detectors 180-1 and 180-2.

The synchronous detectors 180-1 and 180-2 synchronously detects the error signals V8a(t) and V8b(t), from which unwanted frequency components have been removed, at the timing in sync with the sync signal V11(t) to produce detected signals V12a and V12b(t), which are then supplied to a differential amplifier 190.

The differential amplifier 190 outputs an angular velocity detection signal V13(t) having a signal level corresponding to the difference between the two input detected signals V12a(t) and V12b (t). The angular velocity detection signal V13(t) is indicative of a signal level associated with the angular velocity of the oscillator 300 around the Z-axis, thus allowing the angular velocity to be detected electrically.

Here, the capacitor C1 and the capacitor C2 may unintentionally happen to have different capacitances due to variations in the manufacturing process. At this time, the two resonant circuits have mutually different resonance frequencies. However, as with the aforementioned acceleration sensor, the impedance conversion circuits 20'-1 and 20'-2 each include the variable resistor 30', so that feedback control is provided to the resistance value Rdx, as described above, for the resonance frequencies of the two resonant circuits to agree with the frequency of the reference phase signal V1(t). As such, the resonance frequencies of the two resonant circuits generally coincide with each other, thus enabling highly accurate capacitance detection using a single reference phase oscillator.

As described above, the capaciatance detector of the present invention can be applied to an angular velocity sensor for detecting angular velocity based on the respective capacitances of a pair of capacitors having a complementary relation. This makes it possible to detect angular velocity with high accuracy using a single reference phase oscillator. In this embodiment, an impedance conversion circuit and a capacitor to be measured are connected in series with each other to form a frequency dependent negative resistor, thereby implementing an equivalent LC serial resonant circuit. Alternatively, as described in relation to the aforementioned first embodiment, an impedance conversion circuit, a variable resistor, and a capacitor may be used to implement an equivalent LC parallel resonant circuit.

The invention claimed is:

1. A capacitance detector for outputting an electric signal dependent on a capacitance present on an object to be measured, the capacitance detector comprising:
    a measurement terminal to be disposed in contact with or in proximity to the object being measured;
    an impedance conversion circuit connected to the measurement terminal to form a resonant circuit;
    a reference phase oscillator for supplying a reference phase signal at a constant frequency to the resonant circuit;
    phase comparison means for outputting, as a capacitance detected signal, a phase difference signal indicative of a phase difference between a resonant signal, which is extracted from the resonant circuit in response to the reference phase signal being applied to the resonant circuit, and the reference phase signal; and
    resonance frequency regulation means for regulating the resonance frequency of the resonant circuit based on the phase difference signal, wherein:
    the resonance frequency regulation means includes a signal operational unit for outputting, as an error signal, a difference between a signal level of the phase difference signal and a target value of the signal level of the phase difference signal, and a controller for integrating the error signal for output as a control signal; and
    a circuit constant of the resonant circuit is determined based on the control signal.

2. The capacitance detector according to claim 1, wherein:
    the resonant circuit includes a variable resistor connected in series with the impedance conversion circuit to form an equivalent inductance; and
    the resonance frequency regulation means determines a resistance value of the variable resistor based on the control signal.

3. The capacitance detector according to claim 1, wherein:
    the resonant circuit is a frequency dependent negative resistor including a variable resistor as a component thereof; and
    the resonance frequency regulation means determines a resistance value of the variable resistor based on the control signal.

4. The capacitance detector according to claim 1, wherein:
    the circuit constant of the impedance conversion circuit is variable; and
    the resonance frequency regulation means determines a circuit constant of the impedance conversion circuit based on the control signal.

5. A polarization orientation detector for a ferroelectric material, comprising:
    at least one probe to be disposed in contact with or in proximity to a surface of a ferroelectric material; and
    electric field application means for applying an alternating electric field to a capacitor component within the ferroelectric material immediately underneath the probe, wherein
    the polarization orientation detector detects a polarization orientation of the ferroelectric material immediately underneath the probe based on a change in capacitance of the capacitor component caused by an application of the alternating electric field to the ferroelectric material;
    the polarization orientation detector further comprises:
    a resonant circuit including the capacitor component and an impedance conversion circuit,
    a reference phase oscillator for applying a reference phase signal at a constant frequency to the resonant circuit, phase comparison means for creating a phase difference signal indicative of a phase difference between a resonant signal, which is extracted from the resonant circuit in response to the reference phase signal being applied to the resonant circuit, and the reference phase signal, synchronous detection means for synchronously detecting the phase difference signal based on a sync signal and for creating a regenerated signal corresponding to a polarization orientation of the ferroelectric material, and resonance frequency regulation means for regulating the resonance frequency of the resonant circuit based on the phase difference signal;

the resonance frequency regulation means includes a signal operational unit for outputting, as an error signal, a difference between a signal level of the phase difference signal and a target value of the signal level of the phase difference signal, and a controller for integrating the error signal for output as a control signal; and a circuit constant of the resonant circuit is determined based on the control signal.

6. An acceleration sensor, comprising:

a plumb weight displaced due to acceleration acting thereon; and first and second electrodes, the electrodes being disposed apart from the plumb weight and disposed opposite to each other across the plumb weight in a direction of displacement of the plumb weight, wherein:

the acceleration sensor detects an acceleration acting on the plumb weight based on capacitances of a first capacitor and a second capacitor, with the first capacitor having a capacitance determined by a gap length between the plumb weight and the first electrode, and with the second capacitor having a capacitance determined by a gap length between the plumb weight and the second electrode;

the acceleration sensor further comprises a first resonant circuit including the first capacitor and an impedance conversion circuit, a second resonant circuit including the second capacitor and an impedance conversion circuit, a single reference phase oscillator for applying a reference phase signal at a constant frequency to the first and second resonant circuits, phase comparison means for creating a first phase difference signal and a second phase difference signal, the first phase difference signal being indicative of a phase difference between a first resonant signal, which is extracted from the first resonant circuit in response to the reference phase signal being applied to the first resonant circuit, and the reference phase signal, the second phase difference signal being indicative of a phase difference between a second resonant signal, which is extracted from the second resonant circuit in response to the reference phase signal being applied to the second resonant circuit, and the reference phase signal, a signal operational unit for outputting, as an acceleration detection signal, a signal dependent on a difference between the first phase difference signal and the second phase difference signal, and resonance frequency regulation means for regulating the resonance frequency of the first resonant circuit based on the first phase difference signal and for regulating the resonance frequency of the second resonant circuit based on the second phase difference signal;

the resonance frequency regulation means includes a signal operational unit and a controller, the signal operational unit outputting, as an error signal, a difference between a signal level of each of the first and second phase difference signals and a target value of the signal level of each of the first and second phase difference signals, respectively, the controller integrating the error signal for output as a control signal, and a circuit constant of the first and second resonant circuits is determined based on the control signal.

7. An angular velocity sensor, comprising:

an oscillator for oscillating in response to a supplied excitation signal so as to be displaced by Coriolis force acting thereon due to rotational angular velocity around a given axis during oscillation;

an excitation signal generator for supplying the excitation signal to the oscillator; and first and second electrodes, the first and second electrodes being disposed apart from the oscillator and disposed opposite to each other across the oscillator in a direction of displacement of the oscillator, wherein:

the angular velocity sensor detects an angular velocity applied to the oscillator based on capacitances of a first capacitor and a second capacitor, with the first capacitor having a capacitance determined by a gap length between the oscillator and the first electrode, and with the second capacitor having a capacitance determined by a gap length between the oscillator and the second electrode;

the angular velocity sensor further comprises a first resonant circuit including the first capacitor and an impedance conversion circuit, a second resonant circuit including the second capacitor and an impedance conversion circuit, a single reference phase oscillator for applying a reference phase signal at a constant frequency to the first and second resonant circuits, phase comparison means for creating a first phase difference signal and a second phase difference signal, the first phase difference signal being indicative of a phase difference between a first resonant signal, which is extracted from the first resonant circuit in response to the reference phase signal being applied to the first resonant circuit, and the reference phase signal, the second phase difference signal being indicative of a phase difference between a second resonant signal, which is extracted from the second resonant circuit in response to the reference phase signal being applied to the second resonant circuit, and the reference phase signal, a signal operational unit for outputting, as an angular velocity detection signal, a signal dependent on the difference between the first phase difference signal and the second phase difference signal, and resonance frequency regulation means for regulating the resonance frequency of the first resonant circuit based on the first phase difference signal and for regulating the resonance frequency of the second resonant circuit based on the second phase difference signal;

the resonance frequency regulation means includes a signal operational unit and a controller, the signal operational unit outputting, as an error signal, a difference between a signal level of each of the first and second phase difference signals and a target value of the signal level of each of the first and second phase difference signals, respectively, the controller integrating the error signal for output as a control signal, and a circuit constant of the first and second resonant circuits is determined based on the control signal.

8. A capacitance detector for outputting an electric signal dependent on a capacitance present on an object to be measured, the capacitance detector comprising:
- a measurement terminal to be disposed in contact with or in proximity to the object being measured;
- an impedance conversion circuit connected to the measurement terminal to form a resonant circuit;
- a reference phase oscillator for supplying a reference phase signal at a constant frequency to the resonant circuit;
- phase comparison part outputs, as a capacitance detected signal, a phase difference signal indicative of a phase difference between a resonant signal, which is extracted from the resonant circuit in response to the reference phase signal being applied to the resonant circuit, and the reference phase signal; and
- resonance frequency regulation part that regulates the resonance frequency of the resonant circuit based on the phase difference signal, wherein:
- the resonance frequency regulation part includes a signal operational unit for outputting, as an error signal, a difference between a signal level of the phase difference signal and a target value of the signal level of the phase difference signal, and a controller that integrates the error signal for output as a control signal; and
- a circuit constant of the resonant circuit is determined based on the control signal.

9. The capacitance detector according to claim 8, wherein:
- the resonant circuit includes a variable resistor connected in series with the impedance conversion circuit to form an equivalent inductance; and
- the resonance frequency regulation part determines a resistance value of the variable resistor based on the control signal.

10. The capacitance detector according to claim 8, wherein:
- the resonant circuit is a frequency dependent negative resistor including a variable resistor as a component thereof; and
- the resonance frequency regulation part determines a resistance value of the variable resistor based on the control signal.

11. The capacitance detector according to claim 8, wherein:
- the circuit constant of the impedance conversion circuit is variable; and
- the resonance frequency regulation part determines a circuit constant of the impedance conversion circuit based on the control signal.

12. A polarization orientation detector for a ferroelectric material, comprising:
- at least one probe to be disposed in contact with or in proximity to a surface of a ferroelectric material; and
- electric field application part that applies an alternating electric field to a capacitor component within the ferroelectric material immediately underneath the probe, wherein
- the polarization orientation detector detects a polarization orientation of the ferroelectric material immediately underneath the probe based on a change in capacitance of the capacitor component caused by an application of the alternating electric field to the ferroelectric material;
- the polarization orientation detector further comprises:
- a resonant circuit including the capacitor component and an impedance conversion circuit,
- a reference phase oscillator that applies a reference phase signal at a constant frequency to the resonant circuit,
- phase comparison part that creates a phase difference signal indicative of a phase difference between a resonant signal, which is extracted from the resonant circuit in response to the reference phase signal being applied to the resonant circuit, and the reference phase signal,
- synchronous detection part synchronously detects the phase difference signal based on a sync signal and for creating a regenerated signal corresponding to a polarization orientation of the ferroelectric material, and
- resonance frequency regulation part that regulates the resonance frequency of the resonant circuit based on the phase difference signal;
- the resonance frequency regulation part that includes a signal operational unit that outputs, as an error signal, a difference between a signal level of the phase difference signal and a target value of the signal level of the phase difference signal, and a controller that integrates the error signal for output as a control signal; and
- a circuit constant of the resonant circuit is determined based on the control signal.

13. An acceleration sensor, comprising:
- a plumb weight displaced due to acceleration acting thereon; and
- first and second electrodes, the electrodes being disposed apart from the plumb weight and disposed opposite to each other across the plumb weight in a direction of displacement of the plumb weight, wherein:
- the acceleration sensor detects an acceleration acting on the plumb weight based on capacitances of a first capacitor and a second capacitor, with the first capacitor having a capacitance determined by a gap length between the plumb weight and the first electrode, and with the second capacitor having a capacitance determined by a gap length between the plumb weight and the second electrode;
- the acceleration sensor further comprises
- a first resonant circuit including the first capacitor and an impedance conversion circuit,
- a second resonant circuit including the second capacitor and an impedance conversion circuit,
- a single reference phase oscillator for applying a reference phase signal at a constant frequency to the first and second resonant circuits,
- phase comparison part that creates a first phase difference signal and a second phase difference signal, the first phase difference signal being indicative of a phase difference between a first resonant signal, which is extracted from the first resonant circuit in response to the reference phase signal being applied to the first resonant circuit, and the reference phase signal, the second phase difference signal being indicative of a phase difference between a second resonant signal, which is extracted from the second resonant circuit in response to the reference phase signal being applied to the second resonant circuit, and the reference phase signal,
- a signal operational unit that outputs, as an acceleration detection signal, a signal dependent on a difference between the first phase difference signal and the second phase difference signal, and
- resonance frequency regulation part that regulates the resonance frequency of the first resonant circuit based on the first phase difference signal and for regulating the resonance frequency of the second resonant circuit based on the second phase difference signal;
- the resonance frequency regulation part includes a signal operational unit and a controller, the signal operational unit outputting, as an error signal, a difference between a signal level of each of the first and second phase difference signals and a target value of the signal level of each of the first and second phase difference signals, respectively, the controller integrating the error signal for output as a control signal, and a circuit constant of the first and second resonant circuits is determined based on the control signal.

14. An angular velocity sensor, comprising:

an oscillator for oscillating in response to a supplied excitation signal so as to be displaced by Coriolis force acting thereon due to rotational angular velocity around a given axis during oscillation;

an excitation signal generator for supplying the excitation signal to the oscillator; and first and second electrodes, the first and second electrodes being disposed apart from the oscillator and disposed opposite to each other across the oscillator in a direction of displacement of the oscillator, wherein:

the angular velocity sensor detects an angular velocity applied to the oscillator based on capacitances of a first capacitor and a second capacitor, with the first capacitor having a capacitance determined by a gap length between the oscillator and the first electrode, and with the second capacitor having a capacitance determined by a gap length between the oscillator and the second electrode;

the angular velocity sensor further comprises a first resonant circuit including the first capacitor and an impedance conversion circuit, a second resonant circuit including the second capacitor and an impedance conversion circuit, a single reference phase oscillator that applies a reference phase signal at a constant frequency to the first and second resonant circuits, phase comparison that creates a first phase difference signal and a second phase difference signal, the first phase difference signal being indicative of a phase difference between a first resonant signal, which is extracted from the first resonant circuit in response to the reference phase signal being applied to the first resonant circuit, and the reference phase signal, the second phase difference signal being indicative of a phase difference between a second resonant signal, which is extracted from the second resonant circuit in response to the reference phase signal being applied to the second resonant circuit, and the reference phase signal, a signal operational unit that outputs, as an angular velocity detection signal, a signal dependent on the difference between the first phase difference signal and the second phase difference signal, and resonance frequency regulation part that regulates the resonance frequency of the first resonant circuit based on the first phase difference signal and for regulating the resonance frequency of the second resonant circuit based on the second phase difference signal;

the resonance frequency regulation part includes a signal operational unit and a controller, the signal operational unit outputting, as an error signal, a difference between a signal level of each of the first and second phase difference signals and a target value of the signal level of each of the first and second phase difference signals, respectively, the controller integrating the error signal for output as a control signal, and a circuit constant of the first and second resonant circuits is determined based on the control signal.

* * * * *